US006781339B1

(12) United States Patent
Ikeguchi

(10) Patent No.: US 6,781,339 B1
(45) Date of Patent: Aug. 24, 2004

(54) METHOD OF CONTROLLING AN ELECTRONIC CAM TYPE ROTARY CUTTER, AND METHOD OF PRODUCING AN ELECTRONIC CAM CURVE

(75) Inventor: Masao Ikeguchi, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 09/889,047

(22) PCT Filed: Jan. 7, 2000

(86) PCT No.: PCT/JP00/00046

§ 371 (c)(1),
(2), (4) Date: Jul. 11, 2001

(87) PCT Pub. No.: WO00/41858

PCT Pub. Date: Jul. 20, 2000

(30) Foreign Application Priority Data

Jan. 11, 1999 (JP) ........................................ P.11-004523

(51) Int. Cl.[7] .............................................. G05B 19/18
(52) U.S. Cl. ........................ 318/569; 318/560; 318/567; 318/572; 318/578; 318/576
(58) Field of Search ............................ 83/37; 493/429; 318/560, 569, 567, 572, 578, 576

(56) References Cited

U.S. PATENT DOCUMENTS

| | | | |
|---|---|---|---|
| 4,165,665 A | * | 8/1979 | Shimizu et al. ................ 83/287 |
| 4,170,155 A | | 10/1979 | Saito et al. |
| 4,464,959 A | | 8/1984 | Larson |
| 4,720,990 A | * | 1/1988 | Weller .......................... 72/427 |
| 4,724,732 A | | 2/1988 | Miyauchi et al. |
| 5,554,087 A | * | 9/1996 | Hwang et al. ................ 483/62 |
| 5,697,881 A | * | 12/1997 | Nishihara .................... 493/429 |
| 5,765,460 A | | 6/1998 | Wathieu ......................... 83/37 |
| 5,826,479 A | * | 10/1998 | Suzuki et al. ................. 83/318 |
| 5,850,772 A | | 12/1998 | Hayashi ......................... 83/37 |
| 5,950,531 A | * | 9/1999 | Uchiyama .................... 100/353 |

FOREIGN PATENT DOCUMENTS

| | | | |
|---|---|---|---|
| EP | 0 035 462 | 9/1981 | ............ B26D/5/20 |
| JP | 49-890 | 1/1974 | |
| JP | 55-101397 | 8/1980 | ............ B26D/5/40 |
| JP | 5-337729 | 12/1993 | ............ B23D/36/00 |
| JP | 6-262588 | 9/1994 | |
| JP | 7-311609 | 11/1995 | ............ G05B/19/06 |
| JP | 9-277114 | 10/1997 | ............ B23D/25/04 |

OTHER PUBLICATIONS

International Search Report.
Patent Abstracts of Japan 05-337729, Dec. 21, 1993.
Patent Abstracts of Japan 07-311609, Nov. 28, 1995.

* cited by examiner

*Primary Examiner*—Karen Masih
(74) *Attorney, Agent, or Firm*—Sughrue Mion, PLLC

(57) ABSTRACT

A method of controlling an electronic cam type rotary cutter or sealer driven by a servo motor. The method comprises preparing a correct position pattern for a whole region including cutting or sealing and non-cutting or non-sealing zones. An electronic cam curve of a cubic function is used as a position pattern for the non-cutting or nonsealing zone. An electronic cam curve of a quadratic function is used as a speed pattern. A position loop is formed in the whole region on the basis of the electronic cam curve. A position control is performed at every moment on the basis of said prepared correct position pattern, whereby a control is enabled causing a single algorithm to automatically cope with a long and short cutting or sealing operations and a change of a line speed.

5 Claims, 24 Drawing Sheets

FIG. 3A  STRAIGHT BLADE
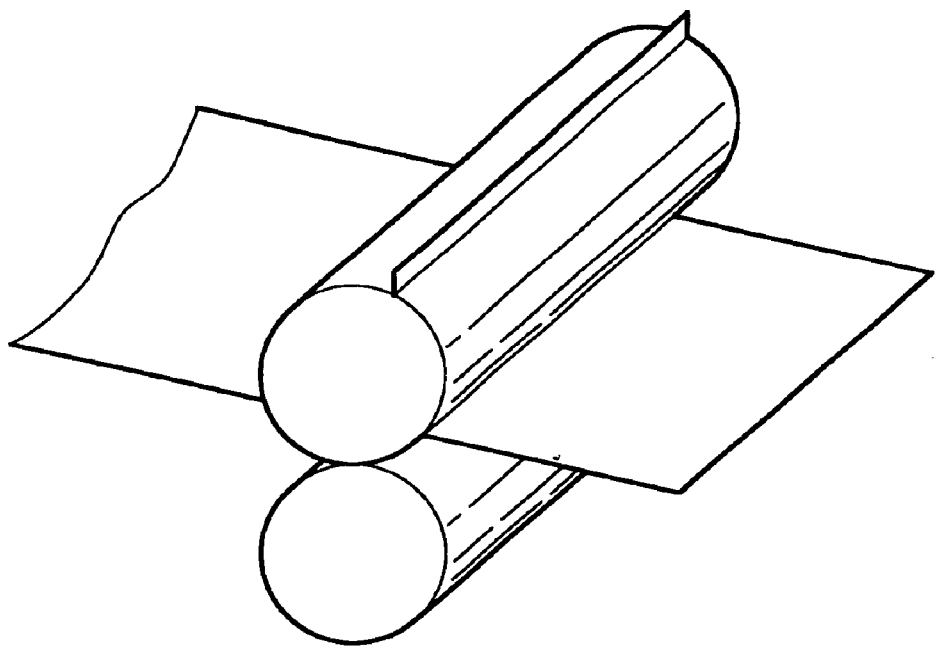
FIG. 3B  SPIRAL BLADE
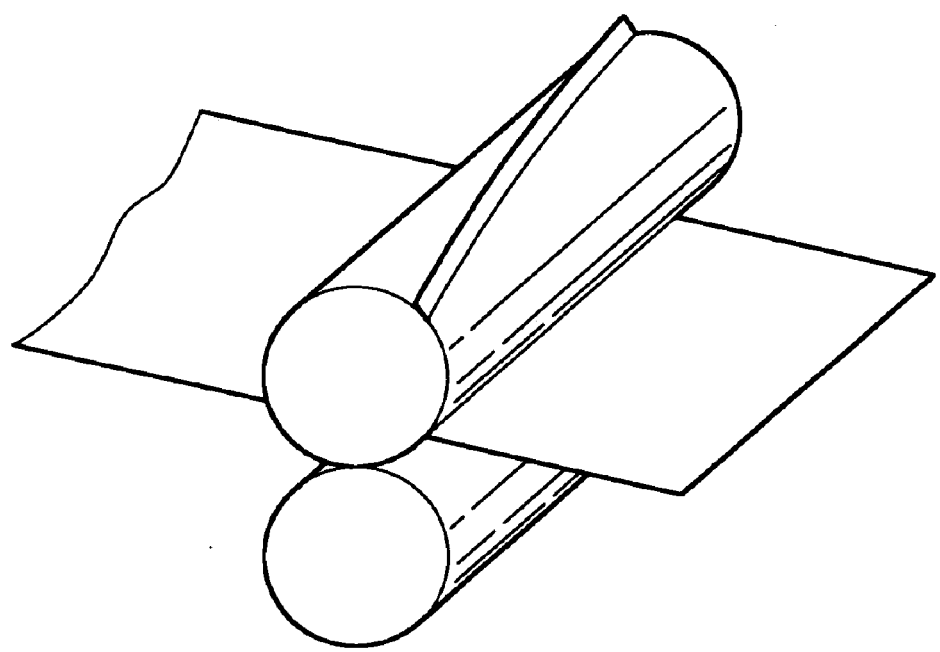

SINGLE BLADE

DOUBLE BLADE

TRIPLE BLADE

QUADRUPLE BLADE

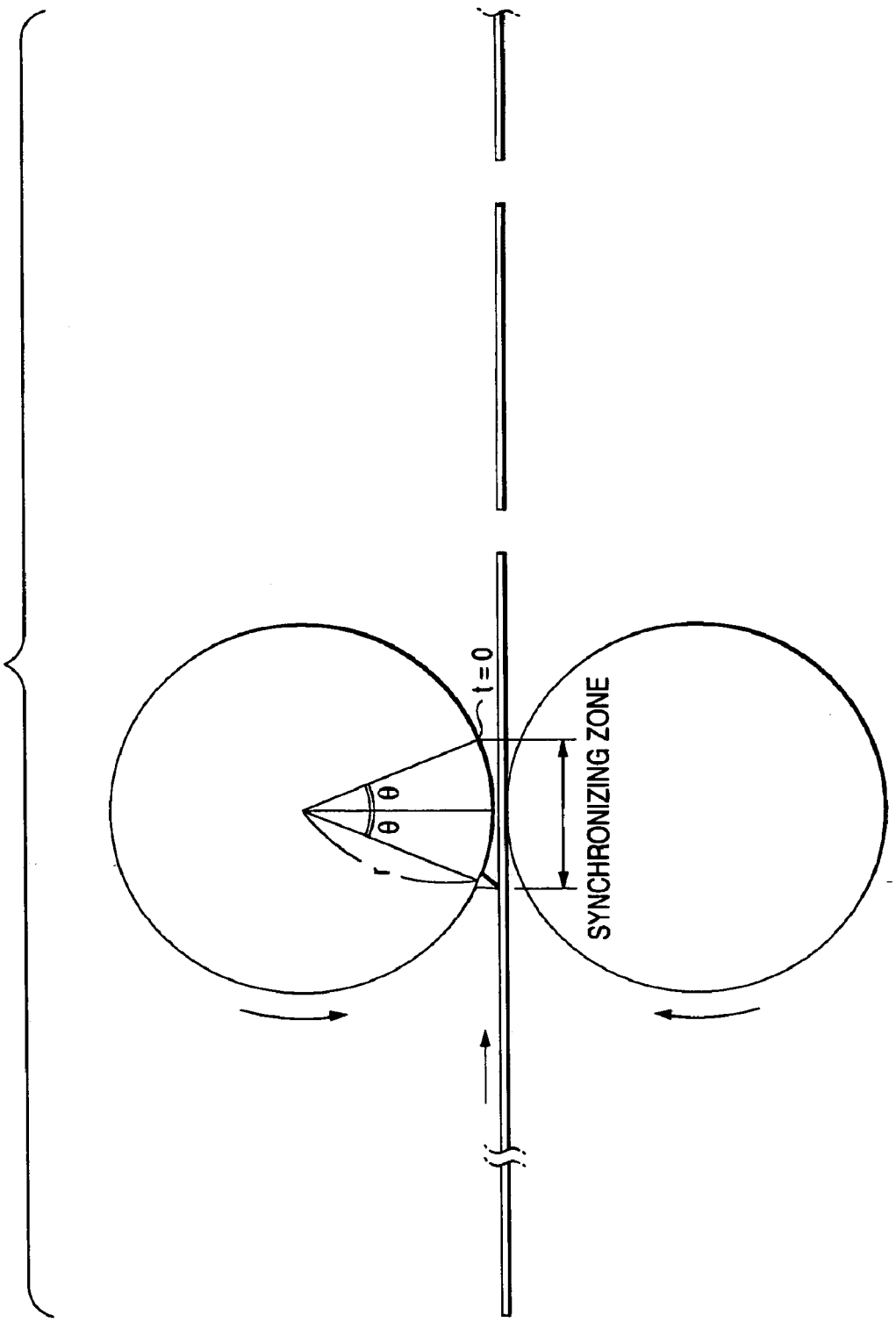

[ CASE OF SPIRAL BLADE ]

FIG. 8

(CAM CURVE EQUATIONS OF SPIRAL BLADE)

| ZONE | CUTTER ROTATIONAL SPEED n (rpm) | CUTTER ROTATIONAL POSITION y (rev) |
|---|---|---|
| ① | $n_1 = 60(3At^2 + 2Bt + C)$ | $y_1 = At^3 + Bt^2 + Ct + D$ |
| ② | $n_2 = N_1$ | $y_2 = \dfrac{(1 - Y_1)}{(T_C - t_3)}(t - T_C) + 1$ |

[ CASE OF STRAIGHT BLADE ]

FIG. 10

(CAM CURVE EQUATIONS OF STRAIGHT BLADE)

| ZONE | CUTTER ROTATIONAL SPEED n (rpm) | CUTTER ROTATIONAL POSITION y (rev) |
|---|---|---|
| ① | $n_1 = 60(3At^2 + 2Bt + C)$ | $y_1 = At^3 + Bt^2 + Ct + D$ |
| ② | $n_2 = \dfrac{60}{2\pi\sqrt{\left(\dfrac{r}{V_0}\right)^2 - \left(t - \dfrac{t_3 + T_c}{2}\right)^2}}$ | $y_2 = \dfrac{1}{360}\sin^{-1}\left\{\left(\dfrac{V_0}{r}\right)\left(t - \dfrac{t_3 + T_c}{2}\right)\right\} + G$ $\left(G = 1 - \dfrac{\theta_0}{360}\right)$ UNIT OF $\sin^{-1} x$: (°) |

[ SPEED PATTERN OF QUADRATIC FUNCTION WAVEFORM ]

[ SPEED PATTERN OF TRAPEZOIDDAL WAVEFORM ]

[ SPEED PATTERN OF GENERALIZED TRAPEZOIDAL WAVEFORM ]

$\alpha rms \geq 2.45$

FIG. 16A  [SINGLE HEATER LATERAL SEALING MECHANISM]
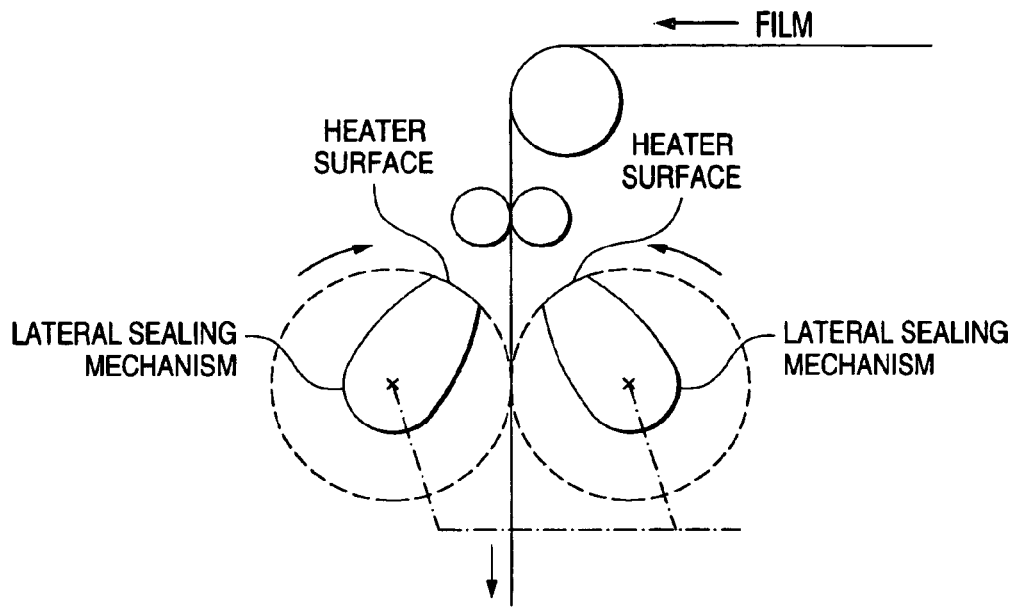
FIG. 16B  [DOUBLE HEATER LATERAL SEALING MECHANISM]
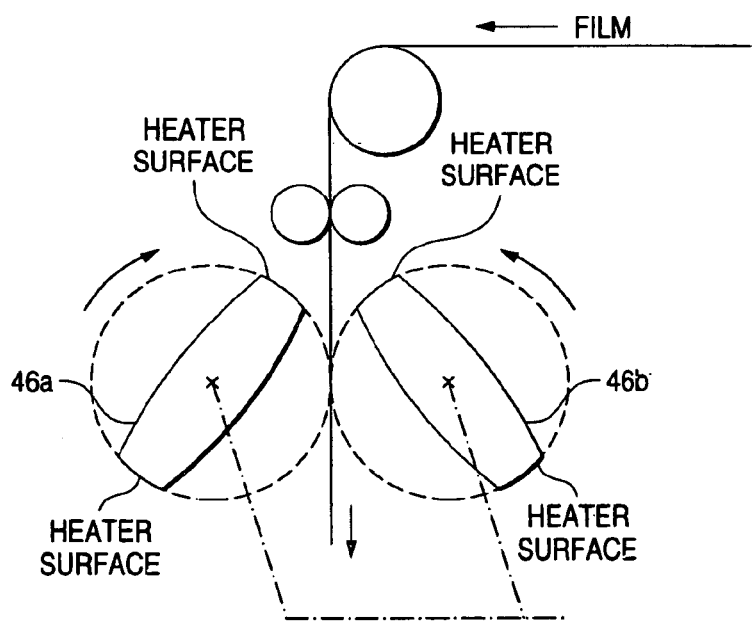

FIG. 19

| ZONE | ROTATIONAL SPEED OF LATERAL SEALING MECHANISM n (rpm) | ROTATIONAL POSITION OF LATERAL SEALING MECHANISM y (rev) |
|---|---|---|
| ① NON SEALIING ZONE | $n_1 = 60(3At^2 + 2Bt + C)$ | $y_1 = At^3 + Bt^2 + Ct + D$ |
| ② SEALING ZONE | $n_2 = N_1$ (CONSTANT) | $y_2 = \dfrac{\frac{1}{M} - Y_1}{Tc - t_3}(t - Tc) + \dfrac{1}{M}$ |

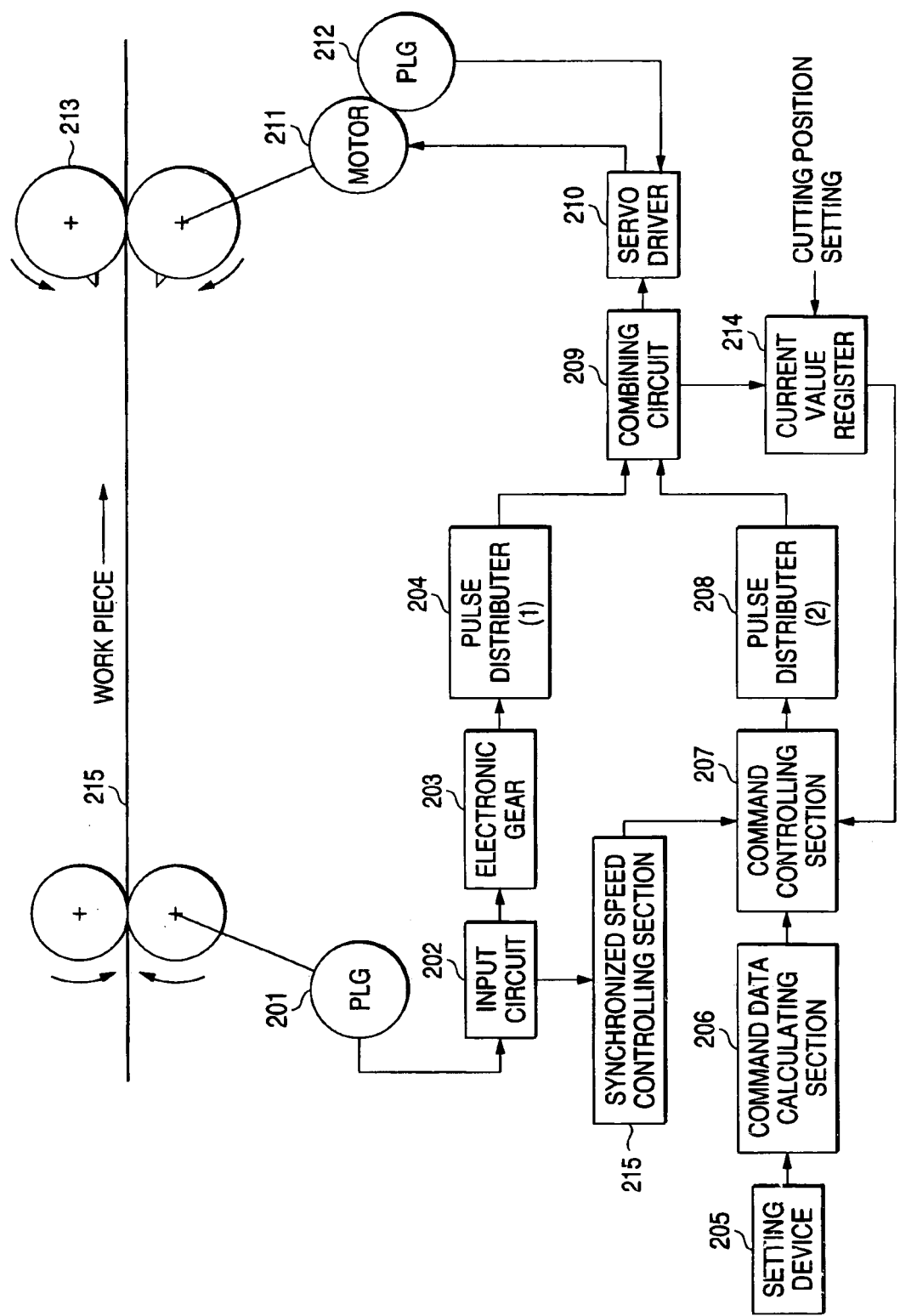

METHOD OF CONTROLLING AN ELECTRONIC CAM TYPE ROTARY CUTTER, AND METHOD OF PRODUCING AN ELECTRONIC CAM CURVE

TECHNICAL FIELD

The present invention relates to a method of controlling a machine in which a motion of a specific portion in one cycle is defined, such as a rotary cutter for continuously cutting web paper, an iron sheet, or the like that successively travels, into a preset length and without stopping the travel, or a continuous packaging machine for performing a sealing work in synchronization with a film, paper, or the like that successively travels, by using a servo motor and producing an electronic cam curve including a prediction to the next cycle.

BACKGROUND ART

As a cutting control method for a rotary cutter of the conventional art, for example, known is a motion controller which is disclosed in JP-A-5-337729. FIG. 20 is a control block diagram of the motion controller of the conventional art. The speed and travel distance of a travelling workpiece 215 are converted at an arbitrary ratio by an electronic gear 203, and a pulse distributor (1) 204 produces a command pulse. The cut length of the workpiece is input through a setting device 205, a position correction amount of a rotary blade is obtained by a command data calculating section 206, a correction pulse is output from a pulse distributor (2) 208, and the pulses are combined with each other by a combining circuit 209, thereby performing a servo control.

Specifically, in the case where, as shown in a speed pattern diagram of FIG. 21, the travelling speed of the workpiece 215 is set to V1 as shown in FIG. 21A and the peripheral speed of the rotary blade 213 is adjusted by the S distributor (1) so as to be equal to the workpiece traveling speed V1 as shown in FIG. 21B, the speed is corrected by a speed waveform V2 due to a position correction command for the rotary blade (by an output of the distributor 2) as shown in FIG. 21C because the cut length of the workpiece 215 does not coincide with the peripheral length of the rotary blade, and, as shown in FIG. 21D, a cutting zone is controlled to the same speed as the line speed of the workpiece 215 and a noncutting zone (correcting zone) is additionally controlled to a speed V3=V2+V1.

Furthermore, FIGS. 21E and 21F show a correcting direction in the case of, for example, a long cutting operation in which the cut length is larger than the peripheral length of the blade, and a subtractive control is performed in the deceleration direction. In addition to the rotary cutter, also a lateral sealing mechanism of a vertical continuous packaging machine, or the like can be control driven.

FIG. 22 is a view showing an example of an electronic cam control of the conventional art, and is a control block diagram of an electronic cam which is disclosed in JP-A-7-311609. In the configuration of FIG. 22, a cam curve 319 which is previously prepared in accordance with operation characteristics of a load 313 is input into a CPU 301 of calculating means, and the CPU 301 outputs a position command value (S), a speed command value (V), and an acceleration command value (A) to comparators in which a subtractor is combined with a counter, a V/F converter, or a differentiator, respectively, and performs an F.B. control on the basis of an output pulse of a PG 314 which detects a displacement of the load 313.

In the conventional art examples, in the case of JP-A-5-337729, however, the correction method in which the cut timing is adjusted by adding (in a short cutting operation) or subtracting (in a long cutting operation) a trapezoidal speed corresponding to the difference between the peripheral length and the cut length, to or from the peripheral speed of the rotary blade that is equal to the line speed V1 of the working line is not novel. In contents of the control also, with respect to the position control, an optimum position pattern is not produced by an electronic cam curve or the like. Therefore, the speed control is performed mainly on the basis of the addition or the subtraction of the corrected speed.

In such a trapezoidal speed control, as shown in FIG. 24, particularly in a control of a rotary cutter, the line speed must be reduced in a short cutting operation because the peak of a torque required during acceleration or deceleration is high. This produces a problem in that the productivity is lowered.

In the case of the proposal of JP-A-7-311609, the technique of reducing the follow-up delay as far as possible by means of a control on the basis of the cam curve 319 (position pattern) which is previously prepared is proposed, and the configuration other than that for using the cam curve is strictly identical with the line configuration of the conventional art. Namely, the configuration of FIG. 22 is a line configuration in which a speed feedforward (V) and a torque compensator (A) by the CPU are added to a position control shown in FIG. 23 and using a conventional servo motor, and is within a range of a conventional control technique. When the speed command (V) and the acceleration command (A) are to be produced by the CPU based on the position pattern only, a differential process must be performed on the basis of the scan period. The speed command (V) and the acceleration command (A) which are produced in this way already lag behind the actual speed.

Therefore, the effect is reduced to one half its original one unless a countermeasure from the viewpoint of the predictive control is taken.

As described above, a system of the conventional art has a problem in that the traceability is so poor that the control accuracy is low.

It is an object of the invention to provide a method of controlling an electronic cam type rotary cutter, and a method of producing an electronic cam curve which, in a control of, for example, a rotary cutter or a continuous packaging machine which is driven by a servo motor, perform a correct position control while a position loop is formed in the whole region and an electronic cam control of a continuous correlation system extending to the next cycle is configured, enable a control due to the same algorithm that can automatically cope with both long and short cut lengths or bag lengths, remarkably improve the productivity in a short cutting operation, have an excellent traceability, and improve the control accuracy.

DISCLOSURE OF INVENTION

In order to attain the object, the invention is characterized in that, in a method of controlling an electronic cam type rotary cutter which is driven by a servo motor, and which is controlled in long and short cutting operations by different speed waveforms on the basis of an electronic cam curve, a position loop is formed in a whole region on the basis of an electronic cam curve, an electronic cam curve of a cubic function is used as a position pattern for a noncutting zone, and an electronic cam curve of a quadratic function is used as a speed pattern, whereby a control is enabled with causing a same algorithm to automatically cope with the long and short cutting operations and a change of a line speed.

According to this configuration, a correct position pattern which is to be controlled is previously prepared, and a position control is performed at every moment over the whole region including the cutting and noncutting zones on the basis of the position pattern, thereby enabling a correct cutting position control on the basis of an electronic cam curve. As the electronic cam curve, a cubic function is used for a position pattern, and a quadratic function is used for a speed pattern. By the control contents based on an algorithm in which continuous correlations between the position and the speed at the timing when the cutting operation is ended, and those at the timing when the cutting operation of the next cycle is started are maintained, a cutting position control can be configured which has an excellent traceability, and in which the same algorithm is enabled to automatically cope with the long and short cutting operations and a change of a line speed.

The invention is characterized in that, in a method of controlling an electronic cam type rotary cutter which is controlled in long and short cutting operations by different speed waveforms on the basis of an electronic cam curve, and in which a line speed is controlled to be reduced in the short cutting operation, a position loop is formed in a whole region on the basis of an electronic cam curve, an electronic cam curve of a cubic function is used as a position pattern for a noncutting zone, and an electronic cam curve of a quadratic function is used as a speed pattern, whereby necessity of reduction of the line speed is eliminated even in a length range which is shorter than a range of a conventional art, and a cutting operation is enabled while maintaining the line speed to 100%.

According to this configuration, the speed pattern based on the electronic cam curve is a quadratic curve, and a torque required for acceleration and deceleration in the noncutting zone is dispersed over the whole of the region, so that the root mean square of the torque is smaller than that in the case of a trapezoidal speed where the acceleration or deceleration time is somewhat short. In a short cutting operation where the acceleration or deceleration frequency is higher, particularly, the cutting is enabled even when the line speed is not lowered to a length which is shorter than that of a conventional art.

In the method of controlling an electronic cam type rotary cutter, preferably, a speed pattern of a spiral blade due to a cam curve diagram is, in a cutting zone, identical with the line speed, and, in the noncutting zone, a quadratic curve which is raised in the short cutting operation, and a quadratic curve which is reduced in the long cutting operation, and a speed pattern of a straight blade is a pattern which is different from the spiral blade in that only the speed in the cutting zone is proportional to $1/\cos\theta$.

According to this configuration, both the spiral blade and the straight blade can be similarly controlled by a speed pattern of a quadratic curve. In the case of a straight blade, the speed pattern in the cutting zone is set to be $1/\cos\theta$, thereby allowing a workpiece which continuously travels at the line speed, to be cut in a direction perpendicularly to the traveling direction in the same manner as the case of a spiral blade.

The invention is characterized in that, after a sealing work, a cutting work, or the like is performed in synchronization with a workpiece in a specific phase zone of one cycle of a rotary mechanism such as a lateral sealing mechanism of a vertical continuous packaging machine which is driven by a servo motor, or a rotary cutter which cuts a workpiece into a constant length, a cubic function is used in a position command according to a continuous correlation control system including a prediction to a start of a work in a next cycle, and a quadratic function is used in a speed feedforward, whereby an optimum electronic cam curve is obtained while allowing a bag length or a cut length of the workpiece to automatically perform correspondence irrespective of a value of peripheral length/M (M=1, 2, ... , the number of sealing faces or blades).

According to this configuration, when a sealing or cutting work is to be performed in synchronization with the line speed of a film, paper, or another workpiece in a specific phase zone (a sealing zone or a cutting zone) in one cycle of the rotary mechanism, a position pattern is used as a position command, and a speed pattern is used as a speed feedforward by a continuous correlation control in which a cubic function is used as a cam curve (the position pattern) satisfying four boundary conditions of the final position and speed in the specific phase zone, and the initial position and speed in a specific phase zone of the next cycle, and a quadratic function that is its differential value is used as the speed pattern, and which includes a predictive control for the next cycle, and an electronic cam control in which the position and speed are again made coincident with the line speed at a initial time in the specific phase zone of the next cycle can be realized.

In the method of producing an electronic cam curve, preferably, a rotational speed $n_2$ and a rotational position $y_2$ of the lateral sealing mechanism or the cutting blade in the sealing zone or the cutting zone are $$n_2 = N_1 \qquad \text{(rpm)}$$

$$y_2 = (1/M - Y_1)(Tc - t_3) \times (t - Tc) + 1/M \qquad \text{(rev)}$$

where $N_1$ is the line speed at a start point, $Y_1$ is a rotational position of a cutting start point, $t_3$ is a time of the cutting start point, and Tc is one cycle time, a curve equation of the nonsealing zone or the noncutting zone is a cubic function having four coefficients satisfying four boundary conditions of velocities $V_1$ and $V_2$ and positions $X_1$ and $X_2$ at times $T_1$ and $T_2$, a position x and a speed v which is obtained by differentiating the position x are indicated by $$x = At^3 + Bt^2 + Ct + D \qquad \text{(rev)}$$

$$v = 3At^2 + 2Bt + C \qquad \text{(rps)},$$

$(T_1, X_1)$ and $(T_2, X_2)$ are substituted into equation x, $(T_1, V_1)$ and $(T_2, V_2)$ are substituted into equation v, the equations are solved for A, B, C, and D, $T_1=0$, $T_2=t_3$, $X_1=0$, $X_2=Y_1$, $V_1=N_t/60$, and $V_2=N_t/60$ are obtain A, B, C, and D, and cam curve equations at a rotational speed=$n_1$ and a rotational position=$y_1$ in the nonsealing zone or the cutting zone, and the rotational speed $n_2$ and the rotational position $y_2$ in the sealing zone or the noncutting zone are obtained as $$n_1 = 60(3At^2 + 2Bt + C)\text{speed} \qquad \text{(rpm)}$$

$$n_2 = N_1 \qquad \text{(rpm)}$$

$$y_1 = At^3 + Bt^2 + Ct + D \; \text{position} \qquad \text{(rev)}$$

$$y_2 = (1/M - Y_1)/(Tc - t_3) \times (t - Tc) + 1/M \qquad \text{(rev)}.$$

According to this configuration, when the coefficients of the four boundary conditions, $(T_1, X_1)$ and $(T_2, X_2)$, and $(T_1,$ $V_1$) and ($T_2$, $V_2$) are substituted into the cubic function having four coefficients position $x=At^3+Bt^2+Ct+D$, and its differential equation or speed $v=3At^2+2Bt+C$, and the equations are solved for A, B, C, and D, the followings are obtained:

$A=\{2(X_1-X_2)-(T_1-T_2)(V_1+V_2)\}/K$ $B=[(V_1-V_2)(T_1-T_2)(T1+2T_2)-3(T_1+T_2)\times\{X_1-X_2-V_2(T_1-T_2)\}]/K$ $C\{6(X_1-X_2)T_1 \cdot T_2+3(T_1+T_2)(V_1 \cdot T_2^2 - {}_2T_1^2)+2(T_1^2+T_1T_2+T_2^2)(V_2 \cdot T_1 \cdot V_1-T_2)\}/K$ $D=-[(X-V_1 \cdot T_1)T_2^2(3T_1-T_2)+(X_2-V_2 \cdot T_2)T_1^2(T_1-3T_2)+2(V_1-V_2)T_1^2 \cdot T_2^2]/K$ $K=-(T_1-T_2)^3$.

When $T_1 \to 0$ (the final time of the cutting or sealing zone), $T_2 \to t_3$ (the initial time of the cutting zone of the next cycle), $X_1 \to 0$ (the position at time $T_1$), $X_2 \to Y_1$ (the position at time $T_2=t_3$), $V_1 \to N_1/60$ (the speed at time $T_1=0$), and $V_2 \to N_1/60$ (the speed at time $t_3$) are substituted into thus obtained A, B, C, and D to obtain A, B, C, and D, it is possible to obtain a cam curve equations, $n_1=60(3At^2+2Bt+C)$ $n_2=N_1$ $y_1=At^3+Bt^2+Ct+D$ $y_2=(1/M-Y_1)/(Tc-t_3)\times(t-Tc)+1/M$.

BRIEF DESCRIPTION OF DRAWING

FIGS. 3A and 3B are views showing kinds of rotary cutter blades shown in FIG. 2.

FIG. 5 is a view showing positional relationships between the rotary cutter blades shown in FIG. 2 and a workpiece.

FIG. 8 is a view showing a cam curve equation of the cam curve shown in FIG. 6.

FIG. 10 is a view showing a cam curve equation of the cam curve shown in FIG. 9.

FIG. 16A and 16B are views schematically showing the structure of the lateral sealing mechanism shown in FIG. 15. (Hereinafter, the figures are often generally referred to as FIG. 16.)

FIG. 19 is a view showing a cam curve equation of the cam curve shown in FIG. 18.

FIG. 20 is a control block diagram of a motion controller of the conventional art.

BEST MODE FOR CARRYING OUT THE INVENTION

Hereinafter, a first embodiment of the invention will be described with reference to the figures.

FIGS. 1 to 14 are views showing the first embodiment of the invention.

Figure 1:
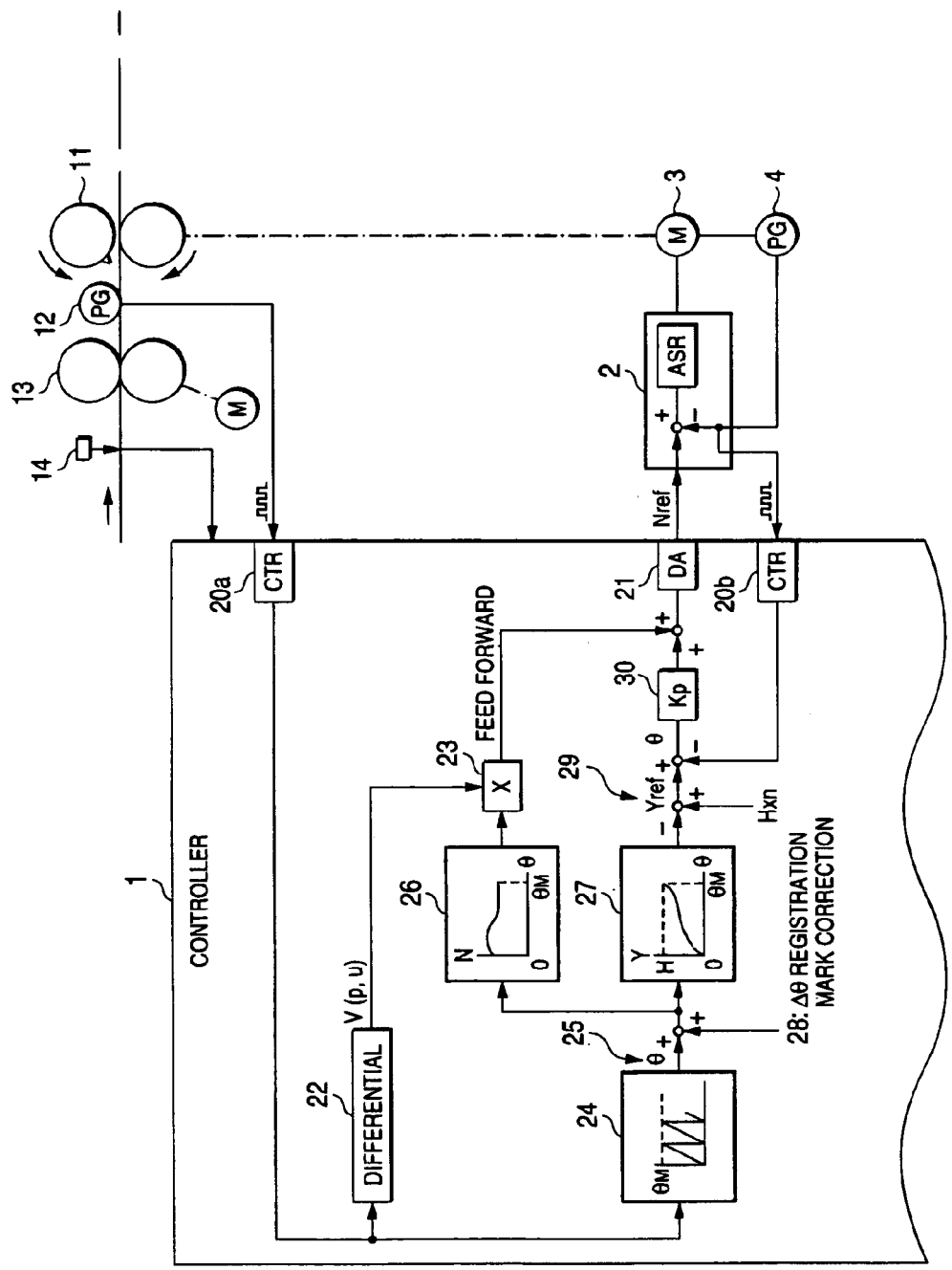
FIG. 1 is a control block diagram of an electronic cam type rotary cutter which is a first embodiment of the invention.

Referring to FIG. 1, 1 denotes a digital controller which performs a constant scan control, 2 denotes a servo driver which drives a servo motor 3, 4 denotes a pulse generator for the motor 3, 11 denotes a rotary cutter which cuts paper, a iron sheet, or the like into a constant length, 12 denotes a measuring roll which detects the travel distance of a workpiece, 13 denotes 20 feed rolls for transporting the workpiece, and 14 denotes a registration mark detector which detects a registration mark of the workpiece.

The reference numeral 20 denotes a counter, 21 denotes a D/A converter which performs conversion on a command value to the servo driver 2, 22 denotes a differential circuit, and 23 denotes a multiplier. The reference numeral 24 denotes a saw-tooth wave generating circuit which generates a phase in one cycle of a cut length, 25 denotes the phase, 26 denotes a speed pattern generator for an electronic cam curve, 27 denotes a position pattern generator, 28 denotes a registration mark correcting circuit, 29 denotes a position command, and 30 denotes a position control gain.

Next, the operation will be described.

Figure 2:
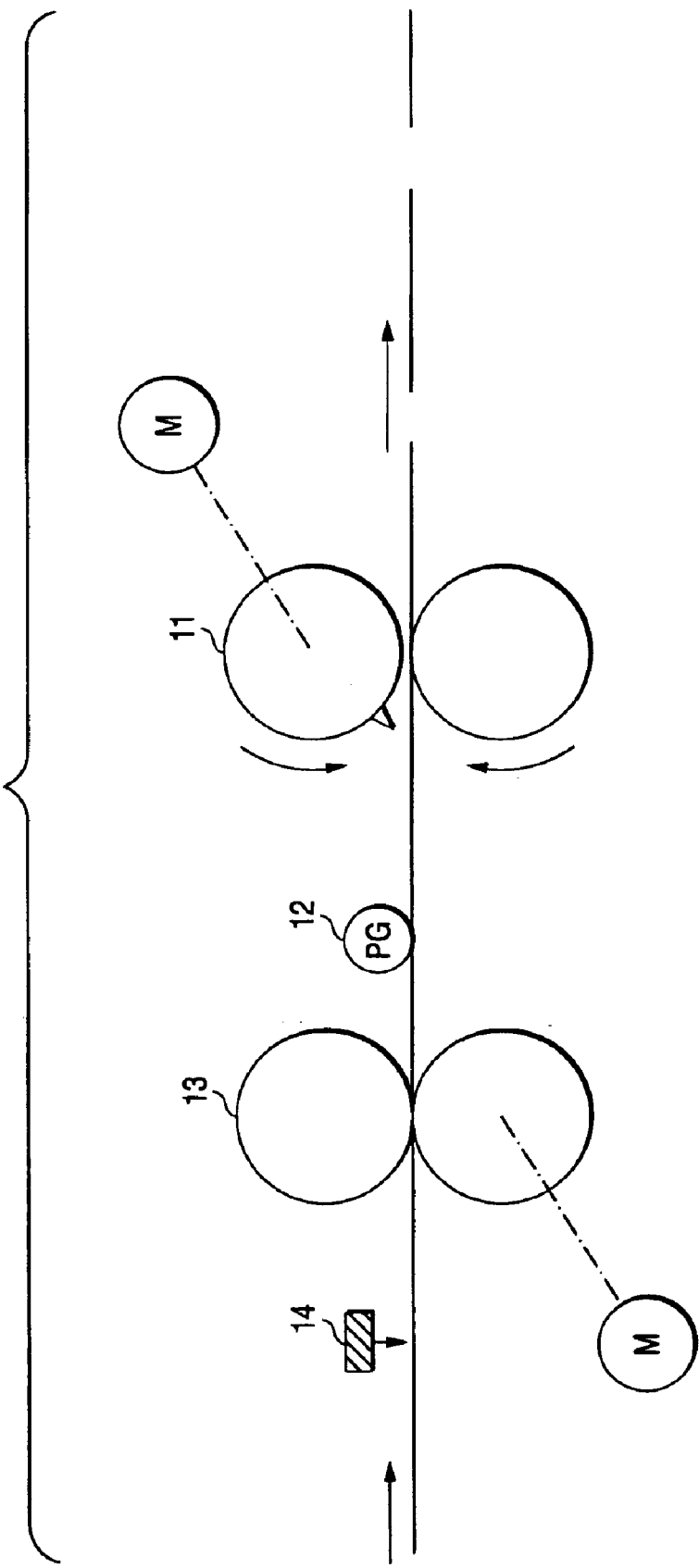
FIG. 2 is a conceptual diagram of the rotary cutter shown in FIG. 1.
Figure 4A:
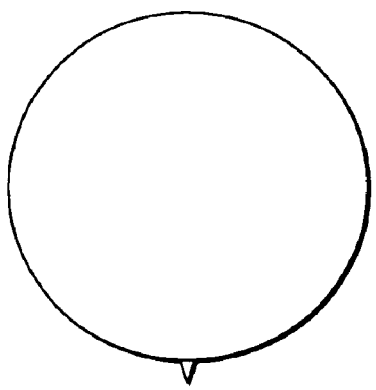
FIGS. 4A to 4D are views showing the structures of the rotary cutter blades shown in FIG. 2.
Figure 4B:
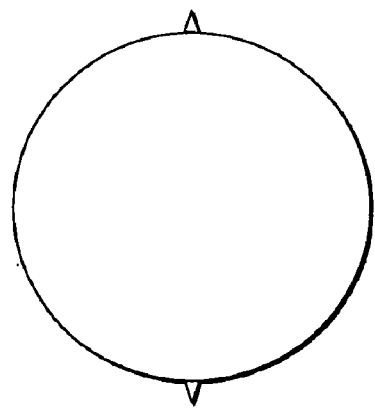
Figure 4C:
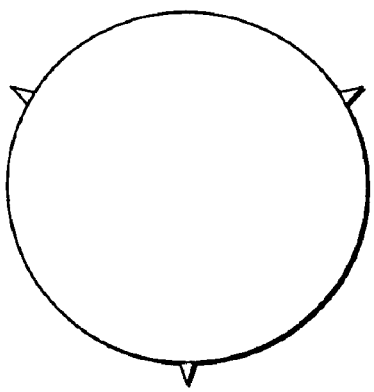
Figure 4D:
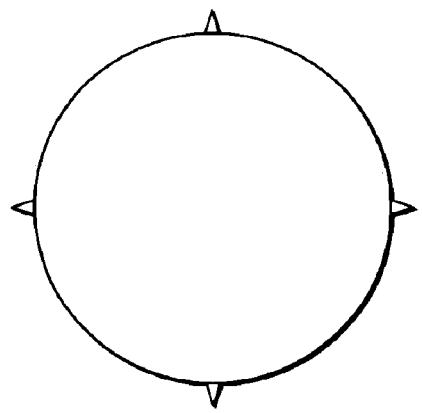

The first embodiment is used for controlling the rotary cutter which continuously cuts web paper, an iron sheet, or the like that successively travels as shown in FIG. 2, into a preset length and without stopping the travel. As shown in FIG. 3, the rotary cutter 11 is provided with either of straight blades of FIG. 3A, or spiral blades of FIG. 3B depending on the blade attachment shape. Since straight blades require a very high pressure in cutting operation, they are not frequently used. Consequently, spiral blades will be mainly described. With respect to straight blades, therefore, control equations and the like will be described only in a supplemental manner. As shown in FIGS. 4A, 4B, 4C, and 4D, in addition to a single blade cutter, a double, triple, or quadruple blade cutter (the number of blades is indicated by M) may be used. These cutters operate in a fundamentally identical manner except that one cycle of the cut length is varied to peripheral length/2, peripheral length/3, or peripheral length/4. Therefore, a single-blade cutter will be described.

In the embodiment, as shown in FIG. 5, an electronic cam control by a continuous correlation control is realized while the end point of a synchronizing zone (cutting zone) is set to the start point t=0 of one cycle and an electronic cam curve including a prediction of the start point of the cutting zone of the next cycle is produced.

Figure 6A:
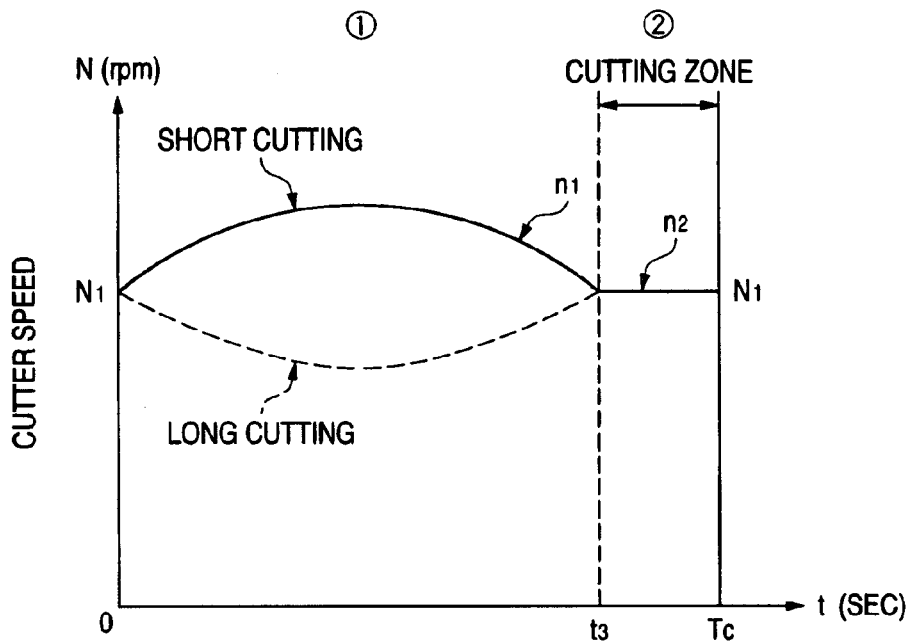
FIGS. 6A and 6B are views showing a cum curve graph of a spiral blade of the rotary cutter shown in FIG. 1. (Hereinafter, the figures are often generally referred to as FIG. 6.)
Figure 6B:
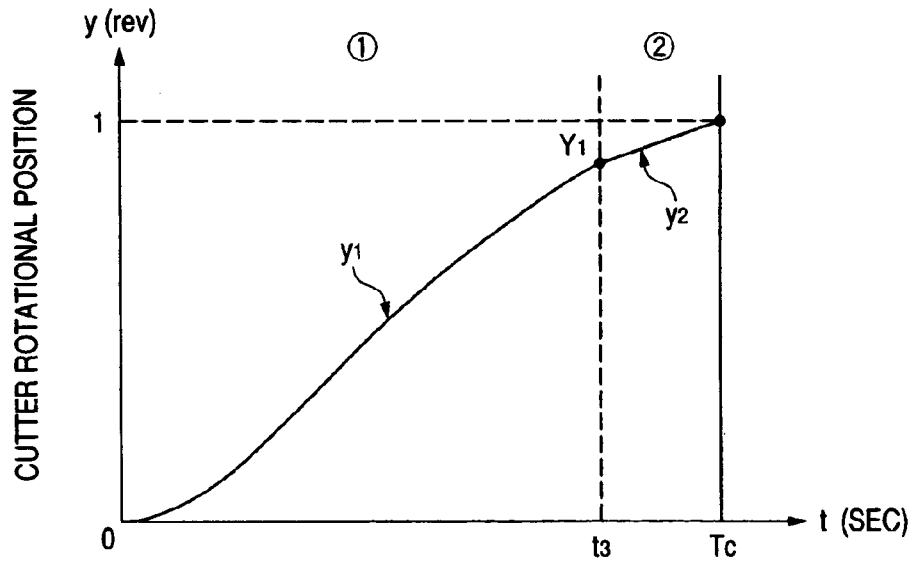

In practice, a control due to a cam curve such as shown in FIG. 6 is performed. FIG. 6A shows a speed pattern, FIG. 6B shows a position pattern, zone (1) is a noncutting zone, and zone (2) is a cutting zone. $N_1$ is a rotational speed in the cutting zone, $n_2$ is a speed in the noncutting zone, Tc is one cycle time, $t_3$ is the time of starting the cutting operation, $y_1$ is the position pattern of the noncutting zone, $y_2$ is the position pattern of the cutting zone, and $Y_1$ is the start position of the cutting operation.

With respect to a method of producing such a cam curve, when the radius of the cutter such as that of FIG. 5=r (mm), the cutting number=$N_0$ (bpm), the cut length Gong or short)=$L_0$ (mm), and the synchronizing angle=$\theta_0$ (°), the followings are attained:

$$\text{speed of workpiece (paper or the like) } V_L = N_0 \times L_0/1000 \ (m/min)$$

$$\text{one cycle time } Tc = 60/N_0 \quad (sec)$$

and the speed $N_1$ at the cutting start point is $$N_1 = 1000 \times V_L/2\pi r \quad (rpm).$$

When the time of the cutting zone is $t_0$ (sec), the following is obtained from the travel distance of the cutting zone:

$$N_1/60 \times t_0 = \theta_0/360$$

$$\therefore t_0 = \theta_0/6N_1$$

Therefore, a cutting start time $t_3 = Tc - t_o$ (sec) is obtained, and the rotational position at $t = t_3$ is $$Y_1 = 1/M - \theta_0/360 \quad (rev).$$

Consequently, the speed and position of the cutter in cutting zone (2) shown in FIG. 6 are obtained as follows:

$$\text{speed } n_2 = N_1 \quad (rpm)$$

$$\text{position } y_2 = (1/M - Y_1)/(Tc - t_3) \times (t - T_c) + 1/M \quad (rev)$$

where 1/M=1 in the case of a single-blade cutter.

By contrast, with respect to noncutting zone (1), a curve equation which satisfies the speed $N_1$ (rpm) and the position 0 (rev) at the time t=0 shown in FIG. 6, and the speed $N_1$ (rpm) and the position $Y_1$ (rev) at the time t=$t_3$ is required.

Figure 7A:
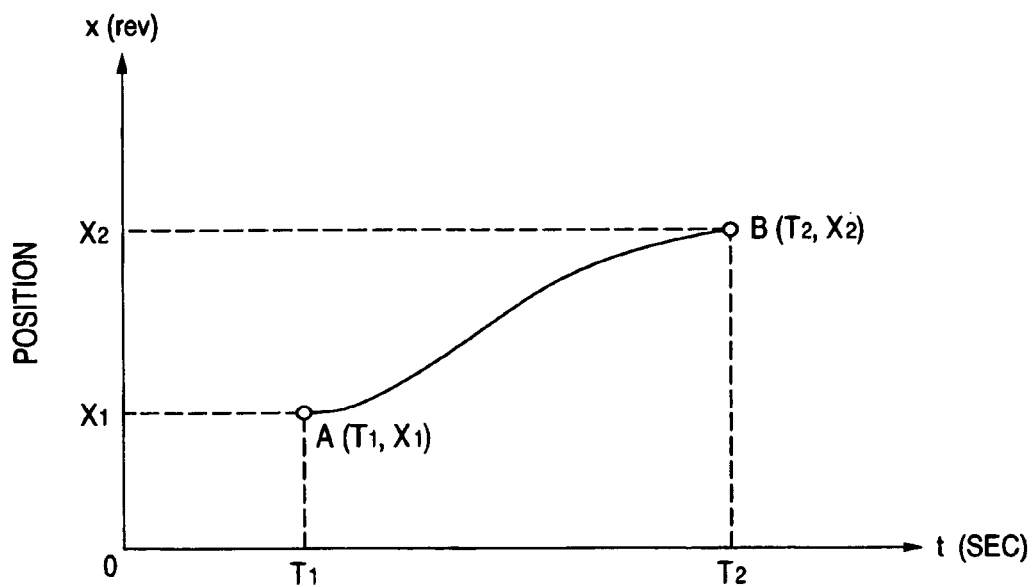
FIG. 7A and 7B are views illustrating a function constituting the cam curve shown in FIG. 6.
Figure 7B:
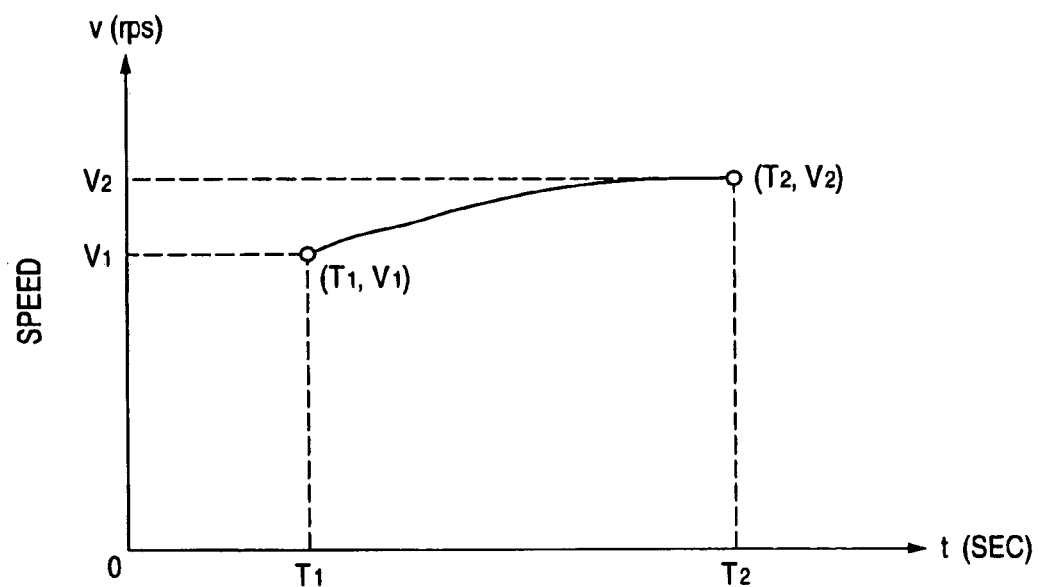

In general, as shown in FIG. 7A, a cubic function having four coefficients corresponds to a curve equation of positions satisfying four boundary conditions of the speed $V_1$ and the position $X_1$ at the time t=$T_1$, and the speed $V_2$ and the position $X_2$ at the time t=$T_2$.

Therefore, when $$\text{the position is } x = At^3 + Bt^2 + Ct + D \quad (rev), \quad (1)$$

the speed v is obtained by equation (2) which is obtained by differentiating the position $$\text{speed } v = 3At^2 + 2Bt + C \quad (rps). \quad (2)$$

When four coefficients ($T_1$, $X_1$) and ($T_2$, $X_2$) are substituted into equation (1) above, ($T_1$, $V_1$) and ($T_2$, $V_2$) are substituted into equation (2), and the equations are divided by K and then solved for A, B, C, and D, following equation (3) is obtained.

$$A = \{2(X_1 - X_2) - (T_1 - T_2)(V_1 + V_2)\}/K$$

$$B = [(V_1 - V_2)(T_1 - T_2)(T_1 + 2T_2) - 3(T_1 + T_2)\{X_1 - X_2 - V_2(T_1 - T_2)\}]/K$$

$$C = \{6(X_1 - X_2)T_1 \cdot T_2 + 3(T_1 + T_2)(V_1 \cdot T_2^2 - V_2 \cdot T_1^2) + 2(T_1^2 + T_1 \cdot T_2 + T_2^3)(V_2 \cdot T_1 - V_1 \cdot T_2)\}/K$$

$$D = -[(X_1 - V_1 \cdot T_1)T_2^2(3T_1 - T_2) + (X_2 - V_2 \cdot T_2)T_1^2(T_1 - 3T_2) + 2(V_1 - V_2)T_1^2 \cdot T_2^2]/K$$

$$K = -(T_1 - T_2)^3. \quad (3)$$

When the actual pattern coefficients shown in FIG. 6,
$T_1 \rightarrow 0$ (the final time of the cutting zone),
$T_2 \rightarrow t_3$ (the initial time of the cutting zone of the next cycle),
$X_1 \rightarrow 0$ (the position at time $T_1$),
$X_2 \rightarrow Y_1$ (the position at time $T_2 = t_3$),
$V_1 \rightarrow N_1/60$ (the speed at time $T_1 = 0$), and
$V_2 \rightarrow N_1/60$ (the speed at time $t_3$)
are substituted into these A, B, C, and D to obtain A, B, C, and D, $$n_1 = 60(3At^2 + 2Bt + C) \quad (rpm)$$

$$n_2 = N_1 \quad (rpm)$$

$$y_1 = At^3 + Bt^2 + Ct + D \quad (rev)$$

$$y_2 = (1/M - Y_1)/(Tc - t_3) \times (t - Tc) + 1/M \quad (rev)$$

where 1/M=1 in the case of a single-blade cutter are obtained as a cam curve equation of the spiral blade of the rotary cutter.

The cam curve equation of the spiral blade is shown in FIG. 8. This equation completely satisfies the boundary conditions of the speed and position at t=0 and t=$t_3$. Therefore, the same algorithm can automatically cope with the cases of a long cutting operation in which the cut length is larger than the peripheral length, and a short cutting operation in which the cut length is smaller than the peripheral length, and also the case where the line speed is changed. Accordingly, a pattern is drawn in which, as shown in FIG. 6A, in the noncutting zone of region (1), the speed in the short cutting operation is raised in the form of a quadratic function, and conversely that in the long cutting operation is reduced in the form of a quadratic function.

Figure 9A:
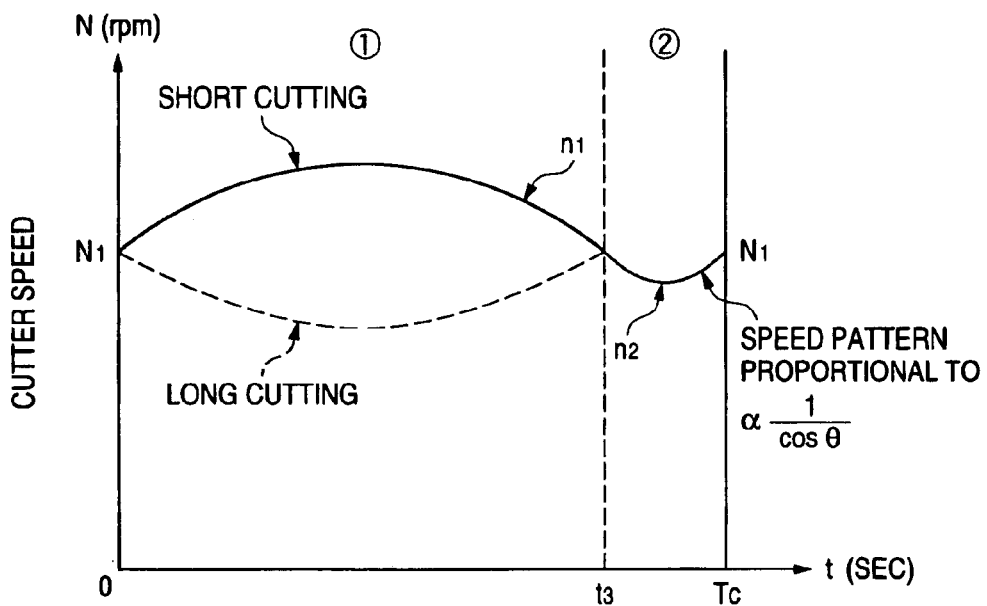
FIGS. 9A and 9B are views showing a cum curve graph in the case where the cutter shown in FIG. 1 is a straight blade. (Hereinafter, the figures are often generally referred to as FIG. 9.)
Figure 9B:
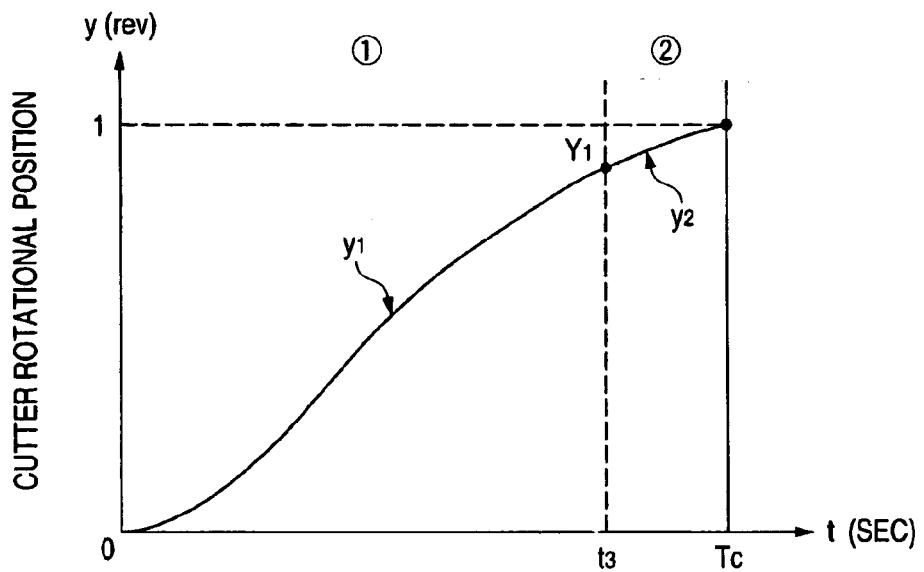

FIGS. 9 and 10 show the cam curve equation and the cam curve pattern in the case of a straight blade. With respect to the cum curve of noncutting zone (1), the cam curve for a spiral blade is strictly identical with that for a straight blade except that, in the case of a straight blade, the speed in cutting zone (2) has a pattern which is proportional to 1/cosθ as shown in FIG. 9A.

Next, the electronic cam control of the rotary cutter which is performed by using the thus obtained speed and position cam curve equations will be further described with reference to FIG. 1.

Pulses output from the measuring roll 12 for detecting the travel distance of a workpiece such as paper or an iron sheet are fetched into the digital controller 1 which performs a constant-period scan control, and then counted by the counter 20a. A phase θ in one cycle where the maximum value is equal to a pulse amount $\theta_M$ corresponding to the cut length is repeatedly obtained by the saw-tooth wave generating circuit 24. The phase is input into the position pattern generating circuit 27 and the speed pattern generating circuit 26 which correspond to one cycle by a cam curve such as shown also in FIG. 6 described above, and a position command Yref 29 and a speed command are obtained at every moment.

With respect to the position command Yref, when one cycle is completed, an addition of the maximum position value (the rotational pulse amount of the servo motor 3 corresponding to the cut length) of the one cycle is performed, whereby the rotary cutter 11 is controlled so as to be continuously rotated in the same direction.

With respect to the thus produced position command, a feedback control is performed by using a pulse count value from the pulse generator for the servo motor 3, and a position control is conducted so as to make the position error ε close to 0, thereby realizing the electronic cam control at every moment.

With respect to the speed pattern, the cam curve equation of FIG. 8 or is previously obtained under the state of 100% of the travelling speed of the paper or the like. V(p, u) which is obtained by normalizing the speed that is actually obtained by the differential circuit 22 is multiplied with an output of the speed pattern generating circuit 26, whereby the speed is used as a feedforward according to the actual travelling speed of the paper or the like, so as to enhance the traceability.

When preprinted paper or the like is to be cut, a registration mark (alignment) which is printed every page simultaneously with printing is detected by the registration mark detector 14, and a position error or the like is corrected by the registration mark correcting circuit 28.

The cam curve equations shown in FIGS. 8 and 10 are obtained as those relating to the time t. Alternatively, such an equation may be used in a control while replacing the time with the travel distance of the paper or the like, i.e., the phase θ (pulse).

When the travel distance of the paper or the like is indicated as $V_L$ (mm/s), the travel distance of the paper or the like at the time $t=t_n$ in one cycle is indicated as $x_n$ (mm), the pulse count amount at the same time in one cycle is indicated as $P_n$ (pulses), and the pulse weight is indicated as $P_w$ (mm/p), the followings are obtained:

$P_n \cdot P_w = V_L \cdot t_n$ $P_n = V_L/P_w \times t_n = K \times t_n$ where $K=V_L/P_W$.

As a result, the time $t_n$ can be replaced with the pulse count amount $P_n$ (i.e., the phase θ) from the measuring roll 12.

Figure 24A:
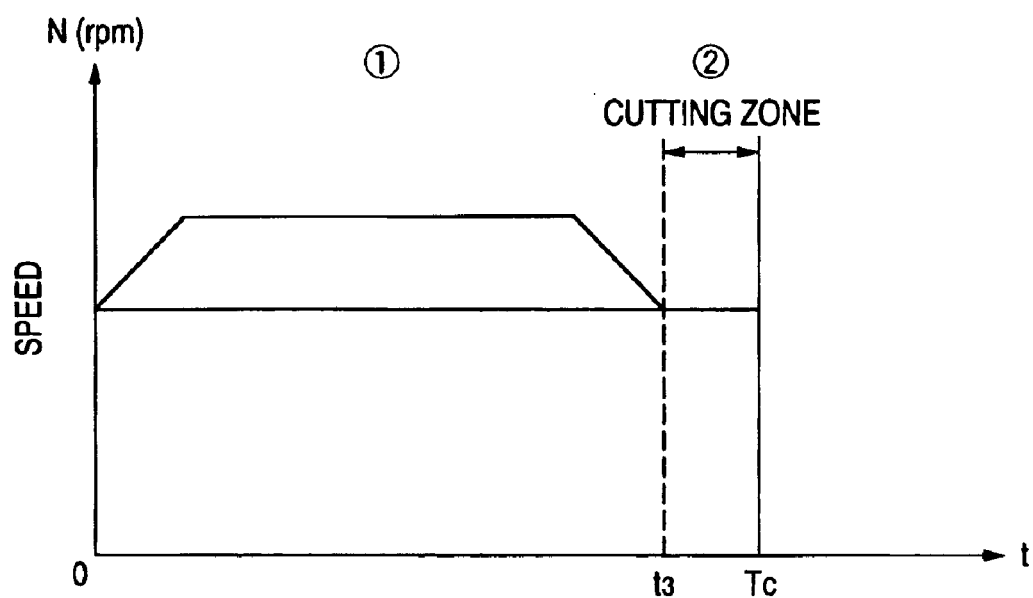
FIGS. 24A and 24B are views showing a trapezoidal wave speed pattern of the conventional art and a torque. (Hereinafter, the figures are often generally referred to as FIG. 24.)
Figure 24B:
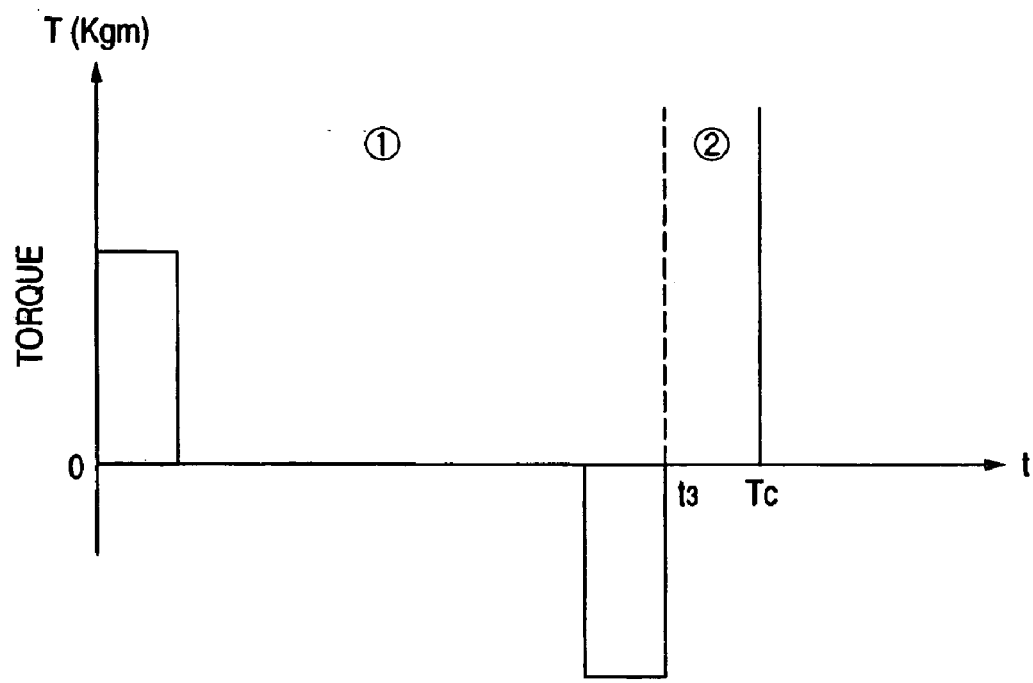

In the control of the conventional art, as shown in the figure of FIG. 24 showing the speed pattern and the torque in the conventional art system, the speed pattern of the noncutting zone shown in FIG. 24A has a trapezoidal waveform, and, in order to satisfy the cycle time and gain the time for stabilizing the speed before the cutting operation, the acceleration or deceleration time is set to be somewhat short as shown in FIG. 24B. Therefore, the peak of a torque required during acceleration or deceleration is high and the root mean square of the torque Trms tends to be large. In a short cutting operation, particularly, the acceleration or deceleration frequency is high, and hence Trms exceeds 100%. In order to prevent this from occurring, the line speed must be lowered, with the result that the productivity is largely impaired.

Figure 14:
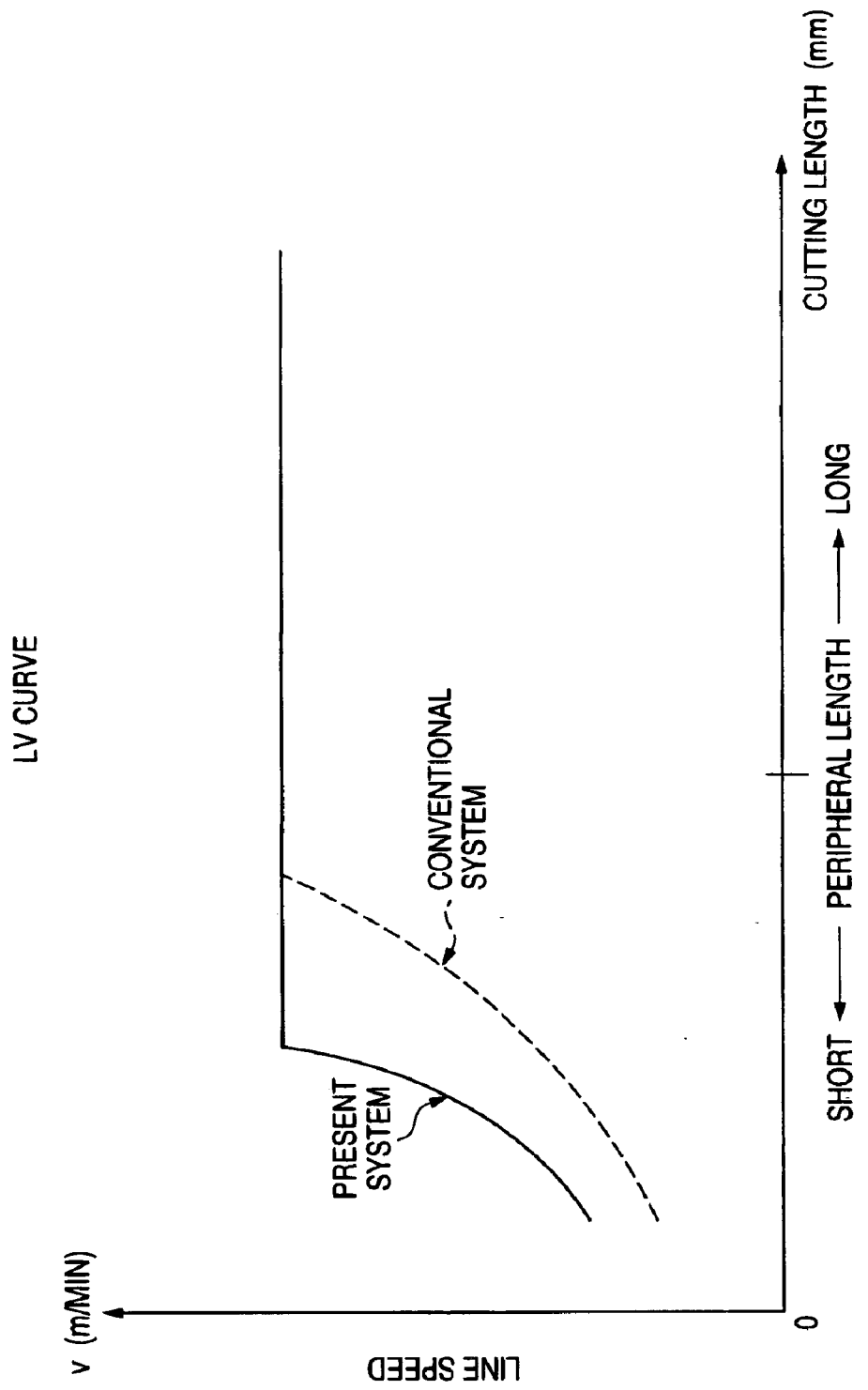
FIG. 14 is a view showing an LV curve of the rotary cutter shown FIG. 1.

As shown in the figure of FIG. 14 showing relationships of the line speed with respect to the cut length, the characteristics of the LV curve which is an important index of the productivity of the rotary cutter are largely impaired as indicated by the broken line.

Figure 11A:
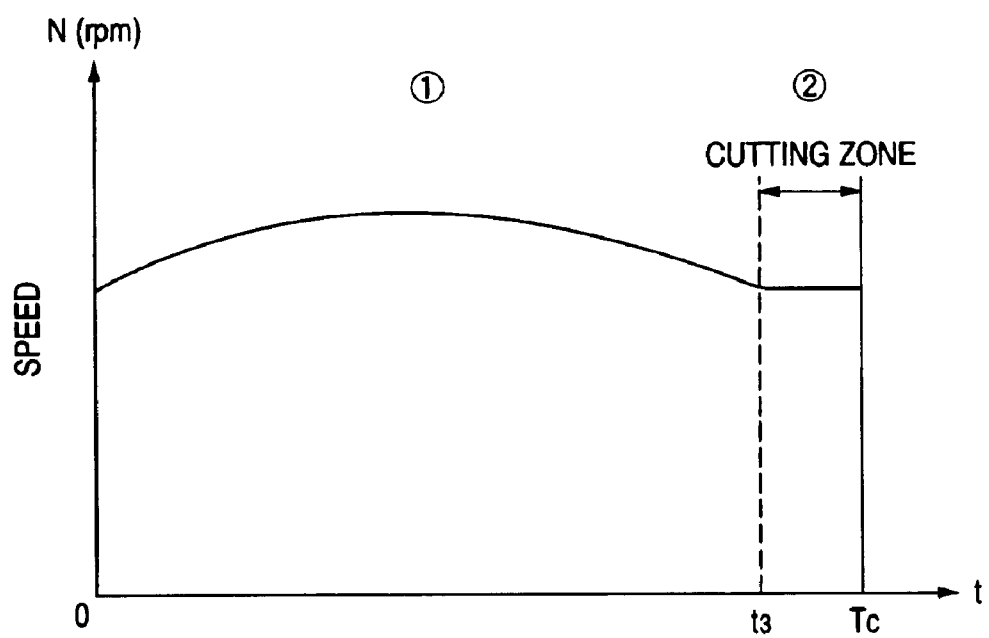
FIGS. 11A and 11B are views showing relationships between the speed pattern shown in FIG. 6 and a torque. (Hereinafter, the figures are often generally referred to as FIG. 11.)
Figure 11B:
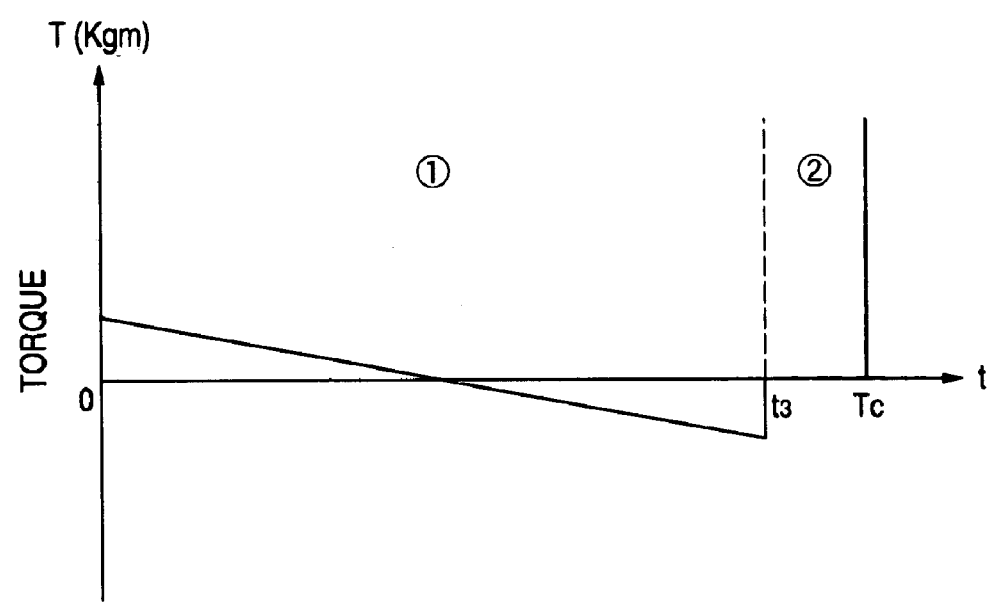

By contrast, FIG. 11 is a view showing the speed pattern and the torque in the invention. In the case of the present embodiment, the speed pattern of noncutting zone (1) is a quadratic curve as shown in FIG. 11A Therefore, the torque required for acceleration and deceleration is dispersed over the whole of zone (1) as shown in FIG. 11B, and hence improvement is enabled.

Figure 12A:
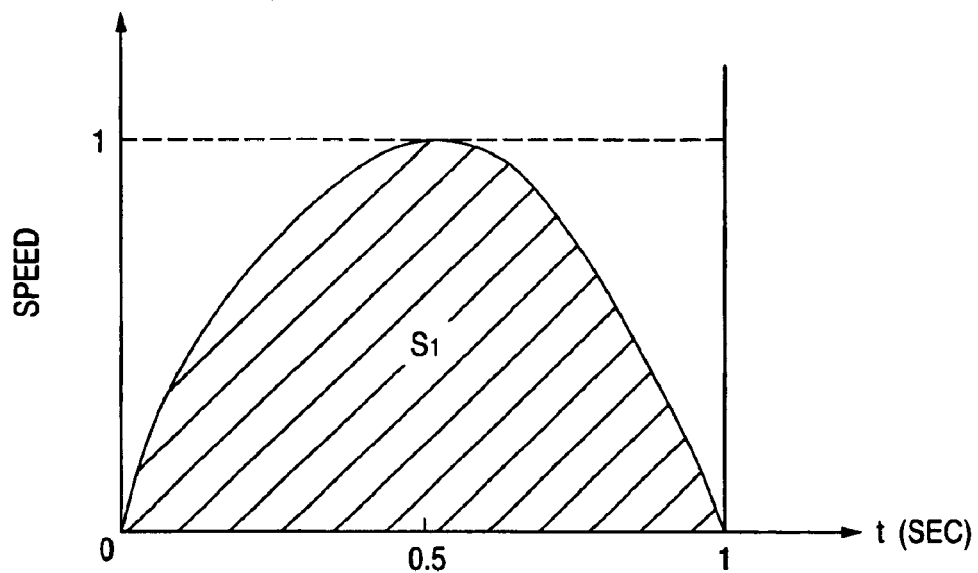
FIGS. 12A and 12B are views comparing a quadratic functional speed pattern shown in FIG. 6 with a trapezoidal speed pattern in the conventional art. (Hereinafter, the figures are often generally referred to as FIG. 12.)
Figure 12B:
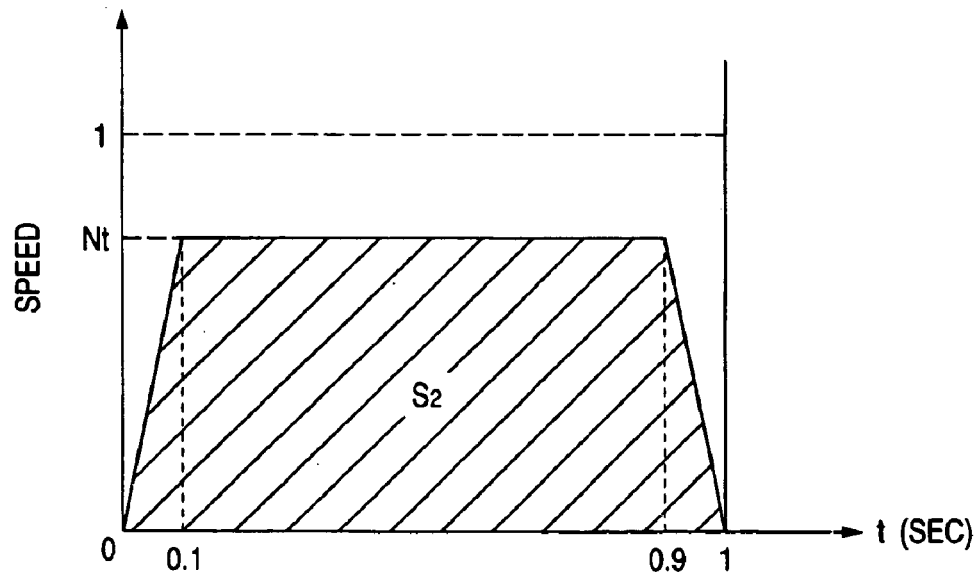

FIG. 12 is a view comparing the quadratic functional speed pattern in the invention with the trapezoidal speed pattern in the conventional art. In the cases where movement over the same distance in a noncutting zone is performed in a quadratic functional speed pattern such as shown in FIG. 12A, and where such movement is performed in a trapezoidal speed pattern such as shown in FIG. 12B, it is assumed that, in order to simplify the description, in the case of the quadratic functional type, a quadratic function which passes t=0 and 1 and which has the maximum value of 1 is used, and movement of its area $S_1$ (corresponding to the noncutting zone) is performed. In this case, the equation of the quadratic functional speed is indicated by the following equation:

$$N=-4(t-0.5)^2+1. \tag{4}$$

The acceleration ax is obtained by differentiating equation (4) as follows:

$$\alpha=dN/dt=-8(t-0.5). \tag{5}$$

As shown in equation (6), the travel distance $S_1$ is obtained by integrating equation (4) from t=0 to t=1.

$$\begin{aligned}S_1 &= \int_0^1 \{-4(t-0.5)^2 + 1\}dt \\ &= 2/3 \\ &\cong 0.667\end{aligned} \tag{6}$$

When the root mean square of the acceleration $\alpha_{rms}$ is applied as the root mean square of the torque, following equation (7) is obtained:

$$\begin{aligned}\alpha rms &= \sqrt{\int_0^1 \{-8(t-0.5)^2\}dt} \\ &= 4/\sqrt{3} \\ &\cong 2.309\end{aligned} \tag{7}$$

In the case of the trapezoidal wave of FIG. 12B, in the case where the acceleration or deceleration time is considered to be tα=0.1, when the maximum value of the speed is Nt, the travel distance $S_2$ is:

$S_2=(0.8+1)\times Nt/2.$

From $S_1=S_2$, $$Nt=0.7407. \tag{8}$$

The acceleration is as follows:

when $0 \leq t < 0.1 \, \alpha = 0.7407/0.1 = 7.407$ when $0.1 \leq t \leq 0.9 \, \alpha = 0$ when $0.9 \leq t \leq 1 \, \alpha = -7.407.$ (9)

Equation (9) contains three $\alpha$s.

From equation (9), the root mean square of the acceleration is obtained as equation (10):

$$\alpha rms = \sqrt{(7.407)^2 \times 0.1 + (-7.407)^2 \times 0.1} \qquad (10)$$
$$= 3.312$$

From the above calculation, equation (7) of the root mean square in a quadratic function waveform, and equation (10) in the case of a trapezoidal waveform are in the relationship of (7)<(10), or $\alpha_{rms}$ of the quadratic function is smaller than that of the trapezoidal waveform.

Figure 13A:
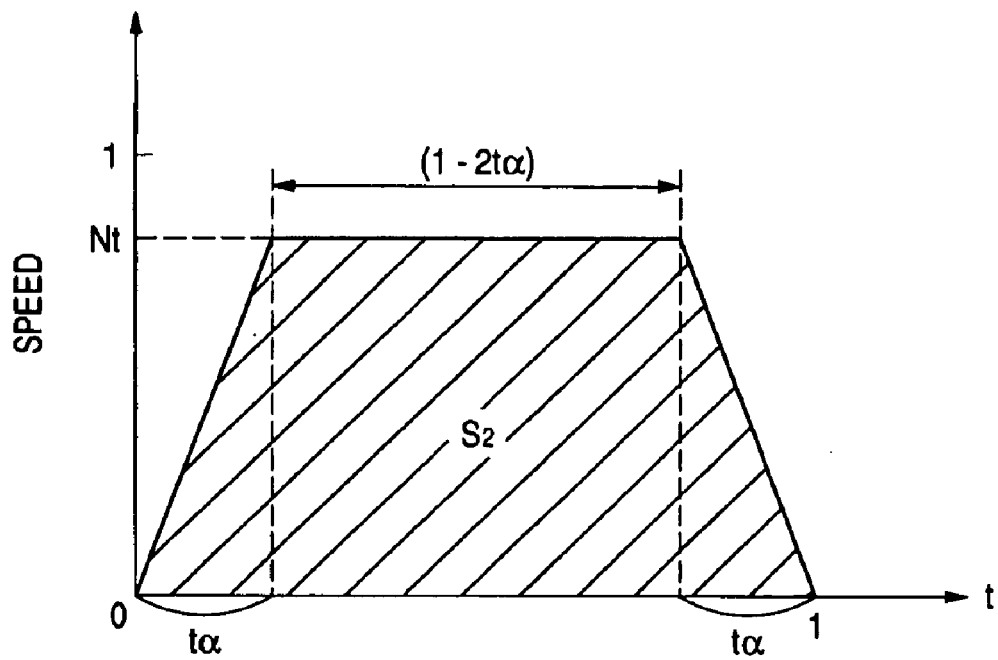
FIGS. 13A and 13B are generalized views of the trapezoidal speed pattern shown in FIG. 12. (Hereinafter, the figures are often generally referred to as FIG. 13.)

In this example, the acceleration time in the case of a trapezoidal waveform is considered to be $t\alpha = 0.1$. FIG. 13 is a view showing a speed pattern which is obtained by generalizing the trapezoidal waveform shown in FIG. 12 while assuming that $0 < t\alpha < 0.5$ is possible. When the acceleration or deceleration time is generalized and considered to be $t\alpha$ in this way, the travel distance $S_2$ in FIG. 13 is:

$$S_2 = \{(1-2t\alpha)+1\} \times Nt/2.$$

Since $S_1 = S_2$, the following is obtained:

$$Nt = 2/3(1-t\alpha). \qquad (11)$$

The acceleration is as follows:

when $0 \leq t < t\alpha \, \alpha = Nt/t\alpha$ when $t\alpha \leq t < (1-t\alpha) \, \alpha = 0$ when $(1-t\alpha) \leq t \leq 1 \, \alpha = -Nt/t\alpha.$ (12)

Equation (12) contains three $\alpha$s.

From equation (12), the root mean square of the acceleration is obtained as equation (13):

$$\alpha rms = \sqrt{(Nt/t\alpha)^2 \cdot t\alpha + (-Nt/t\alpha)^2 \cdot t\alpha} \qquad (13)$$
$$= 2/3(1-t\alpha) \times \sqrt{2/t\alpha}$$

In order to obtain $t\alpha$ which gives the minimum value of equation (13), $d\alpha_{rms}/dt\alpha = 0$ is set, and then the following is obtained:

$$t\alpha = \frac{1}{3}. \qquad (14)$$

Therefore, the minimum value becomes as equation (15):

$$\alpha rms \big|_{T\alpha = 1/3} = \sqrt{6} \qquad (15)$$
$$\cong 2.45$$

Figure 13B:
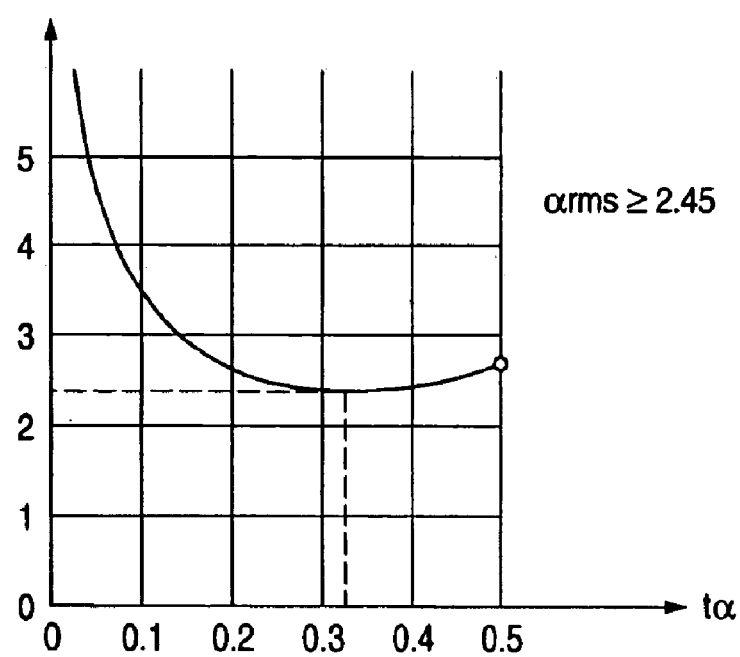

From the above, in the range of $0 < t\alpha < 0.45$ and in the case of a trapezoidal wave as shown in FIG. 13B, $$\alpha_{rms} \geq 2.45$$

is obtained.

Even in this case, therefore, (7)<(15) is obtained, or, even when the speed pattern of a trapezoidal wave is set to have any acceleration or deceleration time, the root mean square of the torque of a speed pattern of a quadratic function is smaller.

As a result, in the LV curve of FIG. 14, according to the trapezoidal waveform of the conventional system, the line speed in the case of a short cutting operation must be earlier lowered, but, according to the system of the invention, the cutting operation can is improved so as to be enabled at 100% of the line speed even in a considerably short range. Therefore, the productivity can be improved as compared with the trapezoidal waveform system of the conventional art. As described above, the acceleration or deceleration time $t\alpha$ in the case of a speed pattern of a trapezoidal waveform in the conventional art is usually set to be somewhat short. Consequently, this effect is particularly large.

Next, a second embodiment of the invention will be described with reference to the figures.

FIGS. 15 to 19 are views relating to the second embodiment of the invention.

Figure 15:
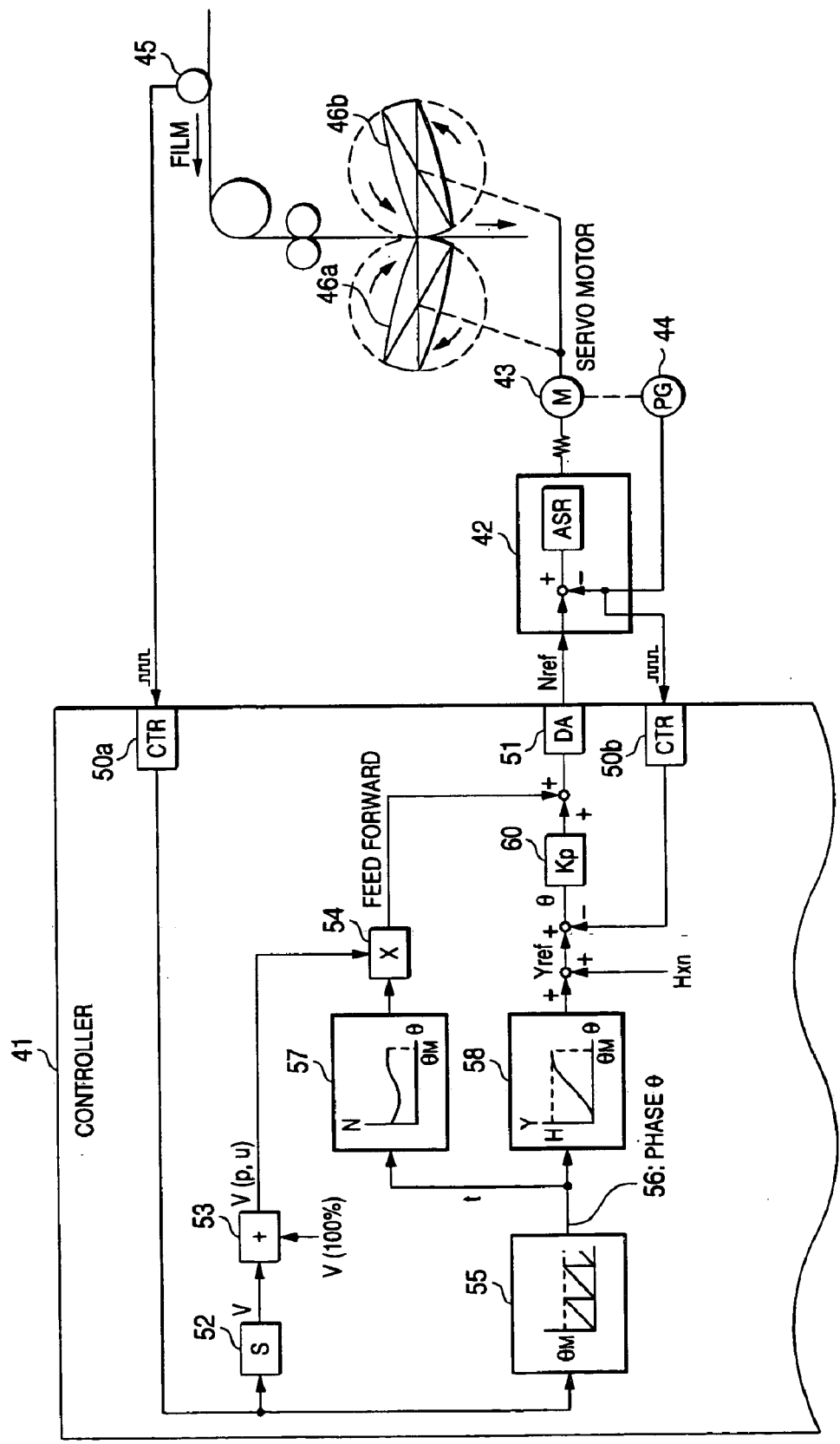
FIG. 15 is a control block diagram of a lateral sealing mechanism of a vertical continuous packaging machine which is a second embodiment of the invention.

Referring to FIG. 15, 41 denotes a digital controller which performs a constant scan control, 42 denotes a servo driver which drives a servo motor 43, 44 denotes a pulse generator for the motor 43, 45 denotes a line PG which detects a line speed for transporting a workpiece such as paper or a film, and 46a and 46b denote lateral sealing mechanisms of a packaging machine which has heating faces and which seals sealing faces.

The reference numerals 50a and 50b denote counters, 51 denotes a D/A converter which performs conversion on a command value to the servo driver 2, 52 denotes a differential circuit, 53 denotes a divider, 54 denotes a multiplier, 55 denotes a saw-tooth wave generating circuit which generates a phase in one cycle of sealing, 56 denotes the phase, 57 denotes a speed pattern generator for an electronic cam curve, 58 denotes a position pattern generator, 59 denotes a position command, and 60 denotes a position control gain.

Next, the operation will be described.

As the lateral sealing mechanism of a vertical continuous packaging machine such as shown in FIG. 16 which is the second embodiment, there are single-heater lateral sealing mechanisms of FIG. 16A, or double-heater lateral sealing mechanisms of FIG. 16B. The mechanisms are driven by the servo motor 43. In order to continuously perform lateral sealing without stopping the bag-like film or the like, the lateral sealing mechanisms in each of which a heater face in the tip end constitutes a part of a circumference are arranged so as to be bilaterally symmetrical, and lateral heaters press the film under a state where the peripheral speed is equal to the film speed, whereby lateral sealing for a predetermined time (sealing time) is realized.

Figure 17:
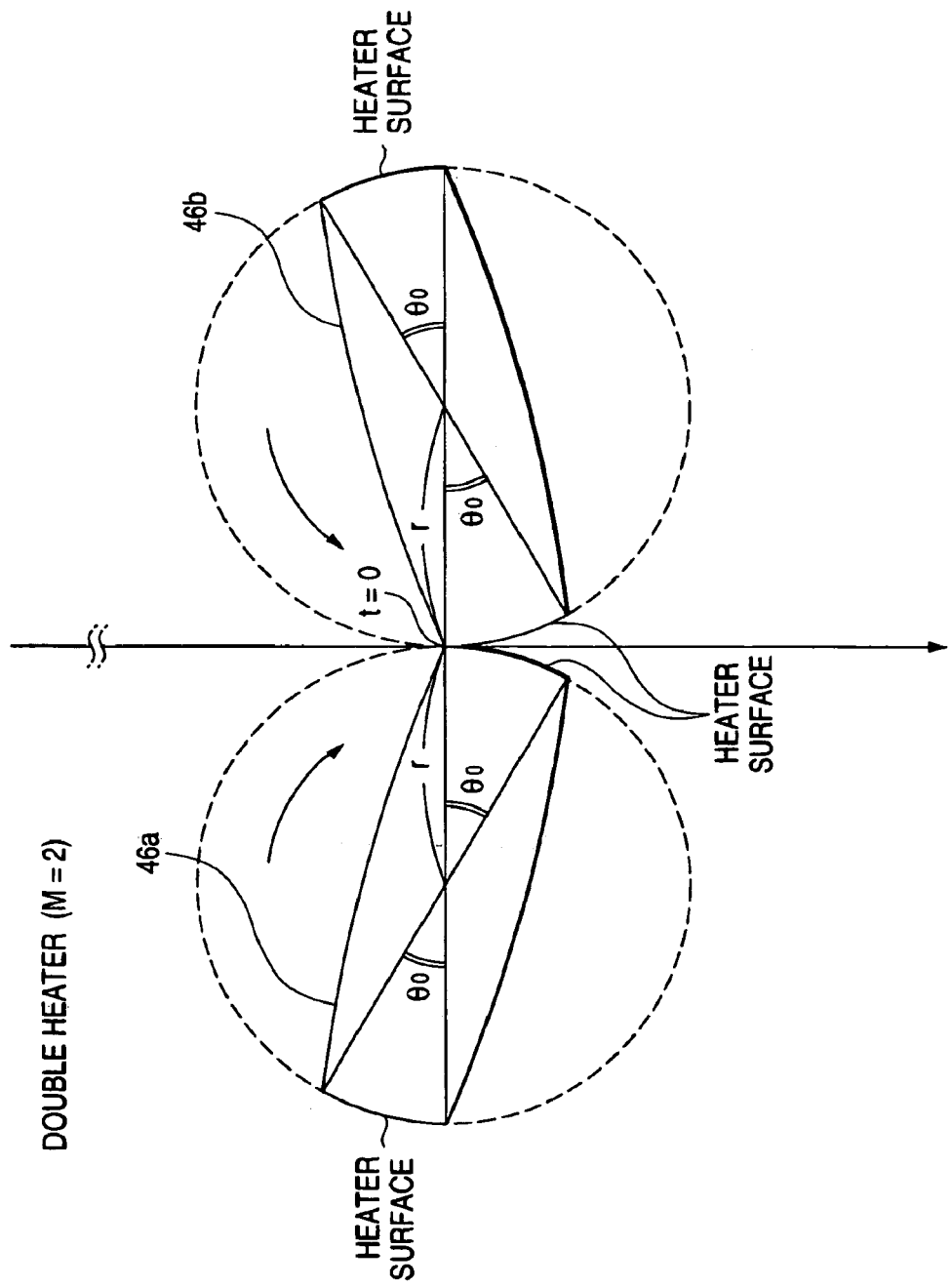
FIG. 17 is a view showing positional relationships in the double-heater lateral sealing mechanism shown in FIG. 16.

FIG. 17 shows positional relationships in the case of the double heating faces 46 in the lateral sealing mechanism. In theory, the number of heaters may be considered to be plural or 3, 4, . . . , and hence the consideration will be made while generalizing as the face number M (M=1, 2, . . . ).

In the embodiment, as shown in FIG. 17, an electronic cam control by a continuous correlation control is realized while the end point of a sealing zone is set to the start point t=0 of one cycle and a cam curve including a prediction of the start point of the sealing zone of the next cycle is produced.

Figure 18A:
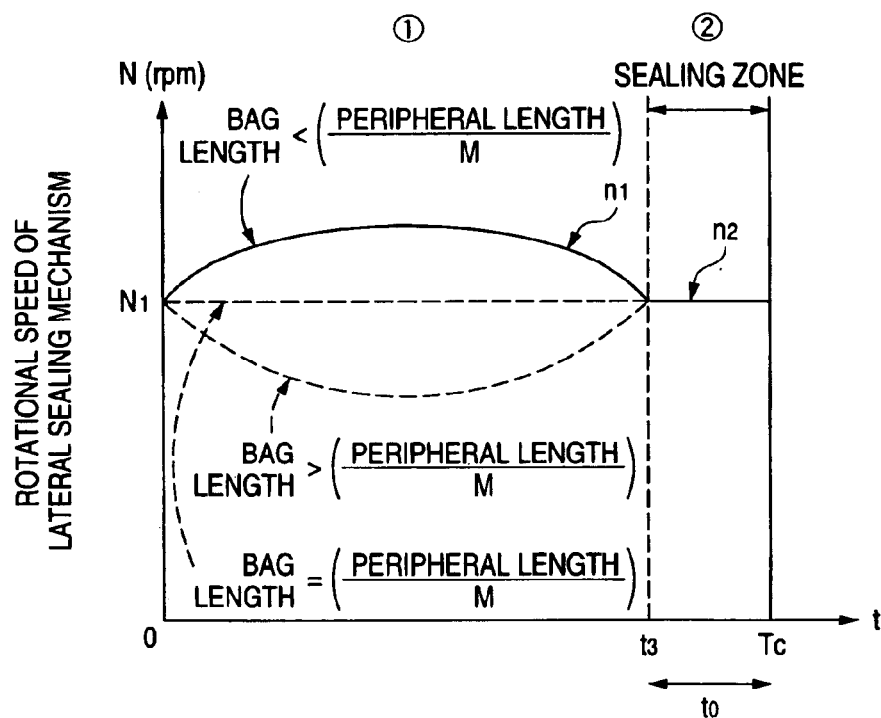
FIGS. 18A and 18B are views showing a cum curve graph of the lateral sealing mechanism shown in FIG. 15. (Hereinafter, the figures are often generally referred to as FIG. 18.)
Figure 18B:
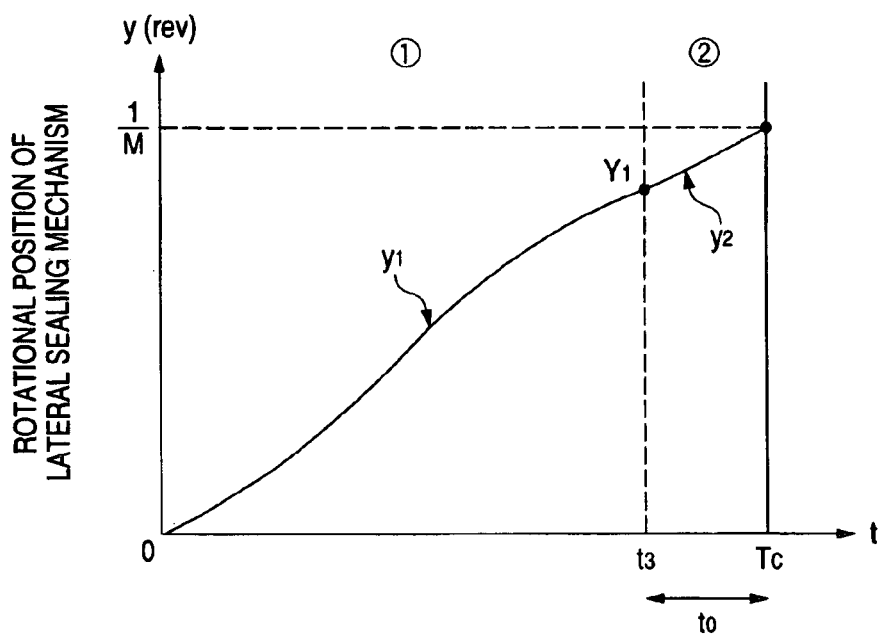
Figure 21A:
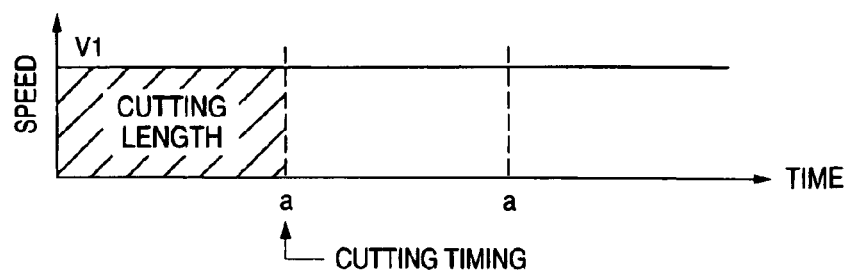
FIGS. 21A to 21F are speed pattern diagrams of the controller shown in FIG. 20.
Figure 21B:
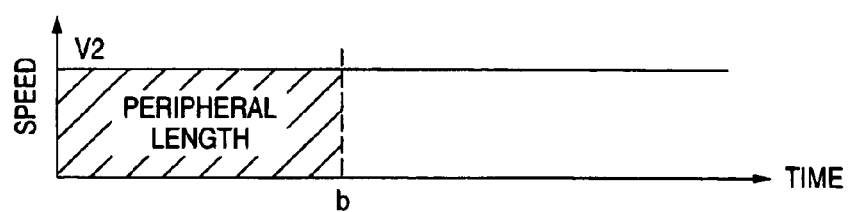
Figure 21C:
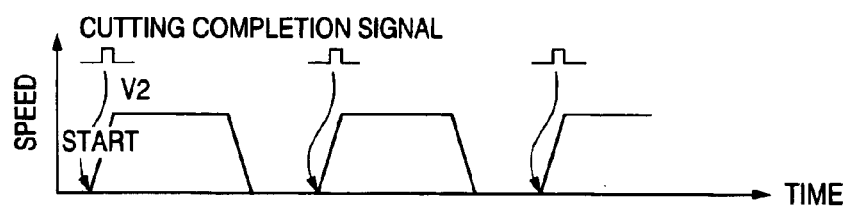
Figure 21D:
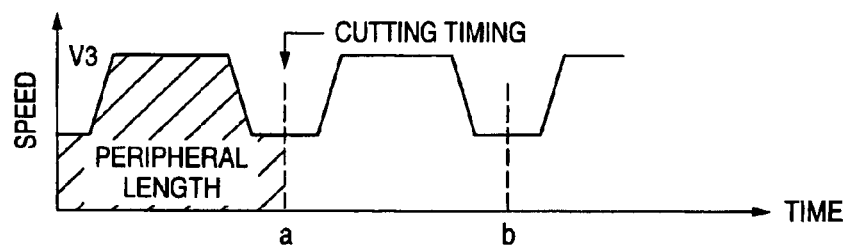
Figure 21E:
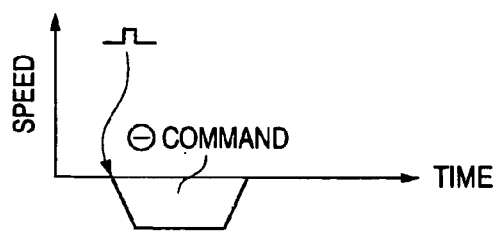
Figure 21F:
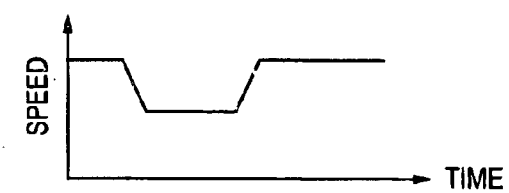
Figure 22:
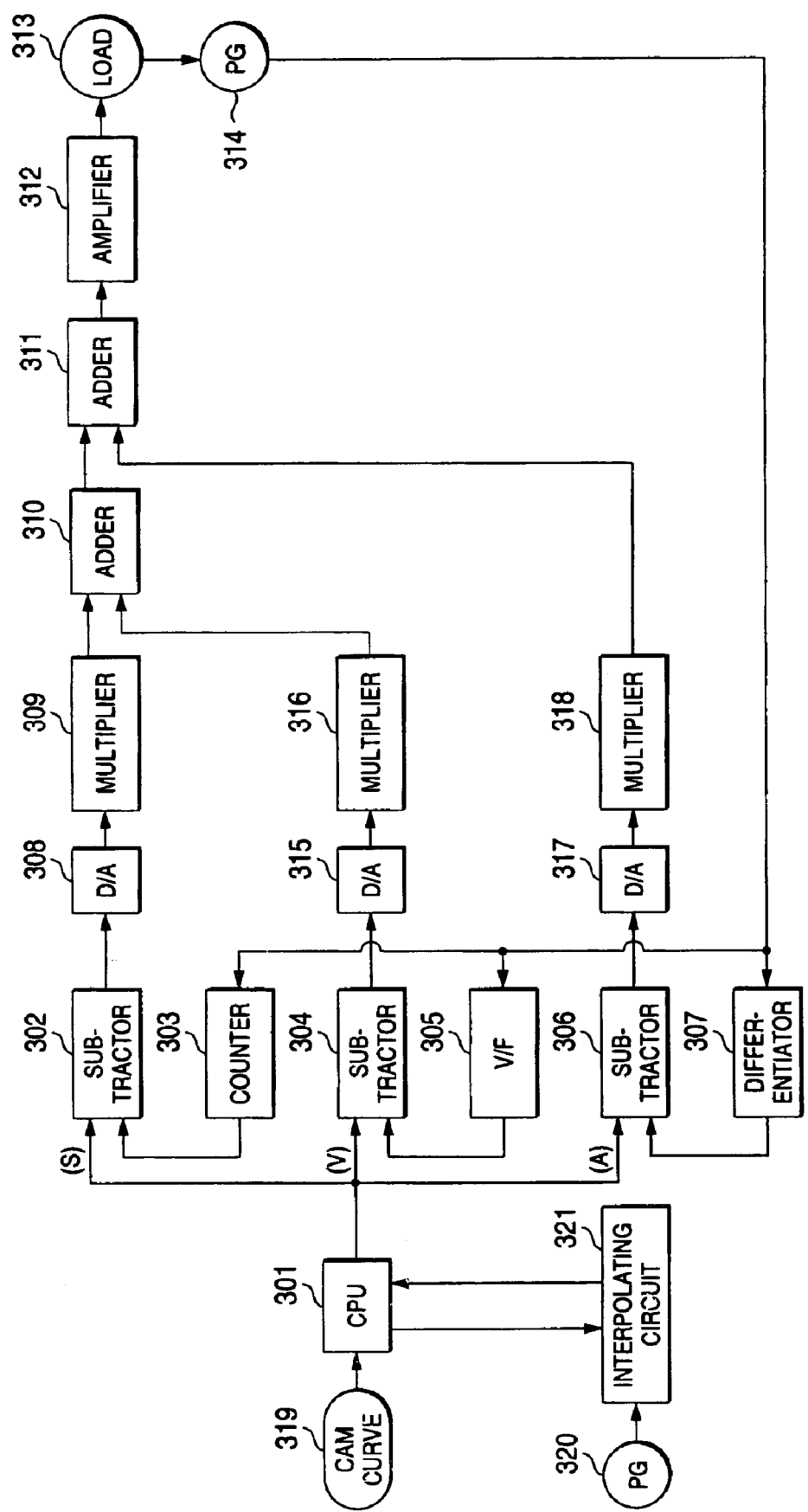
FIG. 22 is a block diagram of an electronic cam control in a conventional art.
Figure 23:
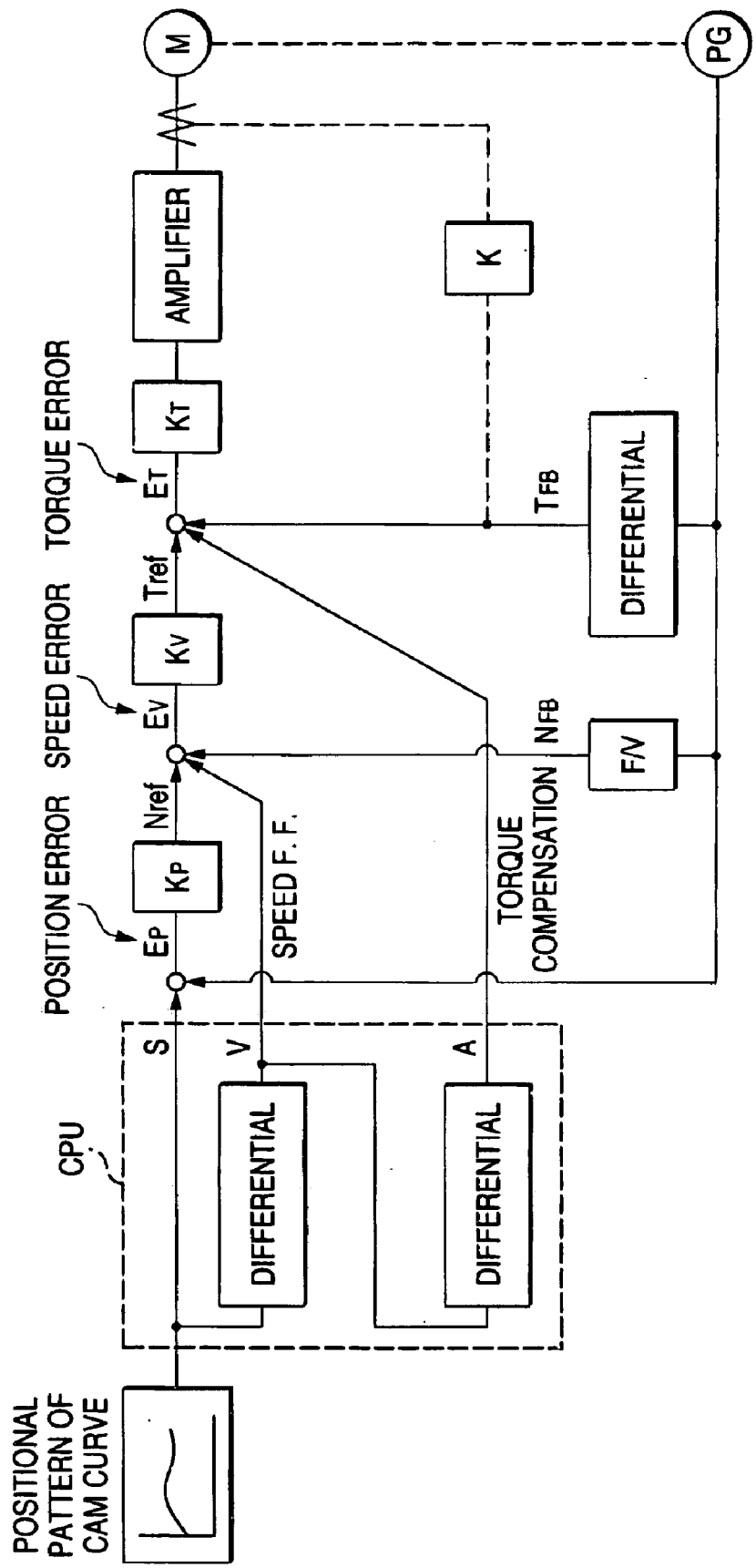
FIG. 23 is a control block diagram of a servo motor of the conventional art.

In practice, a control due to a cam curve pattern such as shown in FIG. 18 is performed. FIG. 18A shows a speed pattern, FIG. 18B shows a position pattern, zone (1) is a nonsealing zone, and zone (2) is a sealing zone. $N_1$ is a rotational speed in the sealing zone, $n_2$ is a speed in the nonsealing zone, Tc is one cycle time, $t_3$ is the time of starting the sealing operation, $y_1$ is the position pattern of the nonsealing zone, $Y_2$ is the position pattern of the sealing zone, and $Y_1$ is the start position of the sealing operation.

With respect to a method of producing such a cam curve, as shown in FIG. 17, when the radius of the lateral sealing mechanism=r (mm), the number of bags to be formed=$N_0$ (bpm), the bag length=$L_0$ (mm), and the synchronizing angle=$\theta_0$ (°), the followings are attained:

speed of the film or the like $V_L = N_0 \times L_0/1000 (m/min)$ one cycle time $Tc = 60/N_0$ (sec)

and
the speed $N_1$ at the sealing start point is $N_1 = 1000 \times V_L/2\pi r$ (rpm).

When the time of the sealing zone is $t_0$ (sec), the following is obtained from the travel distance of the sealing zone:

$N_1/60 \times t_0 = \theta_0/360$ $\therefore t_0 = \theta_0/6N_1$

Therefore, a sealing start time $t_3 = Tc - t_0$ (sec) is obtained, and the rotational position at $t=t_3$ is $Y_1 = 1/M - \theta_0/360$ (rev).

Consequently, the rotational speed and position of the lateral sealing mechanism in sealing zone (2) shown in FIG. 18 are obtained as follows:

rotational speed $n_2 = N_1$ (rpm)

rotational position $y_2 = (1/M - Y_1)/(Tc - t_3) \times (t - T_c) + 1/M$.

By contrast, with respect to nonsealing zone (1), a curve equation which satisfies the speed $N_1$ (rpm) and the position 0 (rev) at the time t=0 shown in FIG. 18, and the speed $N_1$ (rpm) and the position $Y_1$ (rev) at the time $t=t_3$ is required.

In a similar procedure as that of the first embodiment, as shown in FIG. 7A in the previous embodiment, a cubic function having four coefficients corresponds to a curve equation of positions satisfying four boundary conditions of the speed $V_1$ and the position $X_1$ at the time $t=T_1$, and the speed $V_2$ and the position $X_2$ at the time $t=T_2$.

In a similar manner, therefore, when the position is $x = At^3 + Bt^2 + Ct + D$ (rev), (1)

the speed v is obtained by equation (2) which is obtained by differentiating the position speed $v = 3At^2 + 2Bt + C$ (rps). (2)

When four coefficients $(T_1, X_1)$ and $(T_2, X_2)$ are substituted into equation (1) above, $(T_1, V_1)$ and $(T_2, V_2)$ are substituted into equation (2), and the equations are divided by K and then solved for A, B, C, and D, (A, B, C, D) of following equation (3) are obtained.

$A = \{2(X_1 - X_2) - (T_1 - T_2)(V_1 + V_2)\}/K$ $B = [(V_1 - V_2)(T_1 - T_2)(T_1 + 2T_2) - 3(T_1 + T_2)\{X_1 - X_2 - V_2(T_1 - T_2)\}]/K$ $C = \{6(X_1 - X_2)T_1 \cdot T_2 + 3(T_1 + T_2)(V_1 \cdot T_2^2 - V_2 \cdot T_1^2) + 2(T_1^2 + T_1 \cdot T_2 + T_2^2)(V_2 \cdot T_1 - V_1 \cdot T_2)\}/K$ $D = -[(X_1 - V_1 \cdot T_1)T_2^2(3T_1 - T_2) + (X_2 - V_2 \cdot T_2)T_1^2(T_1 - 3T_2) + 2(V_1 - V_2)T_1^2 \cdot T_2^2]/K$ $K = -(T_1 - T_2)^3$. (3)

When the actual pattern coefficients shown in FIG. 18, $T_1 \to 0$ (the final time of the sealing zone), $T_2 \to +t_3$ (the initial time of the sealing zone of the next cycle), $X_1 \to 0$ (the position at time $T_1$), $X_2 \to Y_1$ (the position at time $T_2 = t_3$), $V_1 \to N_1/60$ (the speed at time $T_1 = 0$), and $V_2 \to N_1/60$ (the speed at time $t_3$) are substituted into these A, B, C, and D to obtain A, B, C, and D, $n_1 = 60(3At^2 + 2Bt + C)$ (rpm)

$n_2 = N_1$ (rpm)

$y_1 = At^3 + Bt^2 + Ct + D$ (rev)

$y_2 = (1/M - Y_1)/(Tc - t_3) \times (t - Tc) + 1/M$ (rev)

are obtained as a cam curve equation of the lateral sealing mechanism such as shown in FIG. 19.

The cam curve equation of the lateral sealing mechanism 46 is shown in FIG. 19. This equation completely satisfies the boundary conditions of the speed and position at t=0 and $t=t_3$. As shown in FIG. 18, therefore, the speed in the case of the bag length=(peripheral length/M) is $N_1$ (constant), that in the case of the bag length<(peripheral length/M) is raised in the form of a quadratic function, and that in the case of the bag length> (peripheral length/M) is reduced in the form of a quadratic function.

In the embodiment, the above can be automatically realized. Even when conditions are changed or, for example, the length of a bag to be formed is changed, the simultaneous equations in four unknowns are solved by the controller 41, and a new cam curve (position pattern, speed pattern) is obtained in a moment to realize a control of an excellent traceability.

Next, the electronic cam control of the lateral sealing mechanism 46 which is performed by using the thus obtained speed and position cam curve equations will be further described with reference to FIG. 15.

Pulses output from the line PG 45 for detecting the travel distance of a film, paper, or the like are fetched into the digital controller 41 which performs a constant-period scan control, and then counted by the counter 50a. A phase $\theta$ in one cycle where the maximum value is equal to a pulse amount $\theta_M$ corresponding to the bag length is repeatedly obtained by the saw-tooth wave generating circuit 55. The phase is input into the position pattern generating circuit 58 and the speed pattern generating circuit 57 which correspond to one cycle described above, and a position command Yref 59 and a speed command are obtained at every moment.

With respect to the position command Yref, when one cycle is completed, an addition of the maximum position value (the rotational pulse amount of the servo motor 43 corresponding to 1/Mrev of the lateral sealing mechanism) of the one cycle is performed, whereby the lateral sealing mechanism 46 is controlled so as to be continuously rotated in the same direction.

With respect to the thus produced position command, a feedback control is performed by using a pulse count value from the pulse generator 44 for the servo motor 43, and a position control is conducted so as to make the position error $\epsilon$ close to $\theta$, thereby realizing the electronic cam control at every moment. With respect to the speed pattern, the cam curve equation of FIG. 19 is previously obtained under the state of 100% of the travelling speed of the film, paper or the like. V(p, u) which is obtained by dividing the speed V that is actually obtained by the differential circuit 52, with 100% of the speed V (100%) is multiplied with an output of the speed pattern generating circuit 57, whereby the speed is used as a feedforward according to the actual travelling speed of the actual film, paper or the like, so as to enhance the traceability.

The cam curve equation shown in FIG. 19 is obtained as that relating to the time t. Alternatively, such an equation may be used in a control while replacing the time with the travel distance of the film, paper or the like, i.e., the phase $\theta$ (pulse).

When the travel distance of the film or the like is indicated as $V_L$ (mm/s), the travel distance of the film or the like at the time $t=t_n$ in one cycle is indicated as $x_n$ (mm), the pulse count amount at the same time in one cycle is indicated as $P_n$ (pulses), and the pulse weight is indicated as $P_w$ (mm/p), the followings are obtained:

$$P_n P_w = V_L \cdot t_n$$

$$P_n = V_L/P_w \times t_n = K \times t_n \text{ where } K = V_L/P_W.$$

As a result, the time $t_n$ can be replaced with the pulse count amount $P_n$ (i.e., the phase θ) from the measuring roll 12.

As described above, the embodiment has a very high traceability and can cope with a change in conditions in a completely automatic manner. In a conventional art system, a lateral sealing mechanism is coupled to a driving shaft for transporting a workpiece such as a film, and driven at constant rotation. In the single-heater type, therefore, only a bag of a length which corresponds to a circumference can be sealed, and, in a double-heater lateral sealing mechanism of the 180° symmetric type, only a bag of a length which corresponds to a half circumference can be sealed. When a bag of another length is to be sealed, the lateral sealing mechanism must be replaced with one having a different radius. In the case where a bag of a length other than a circumference or a half circumference is to be sealed, therefore, the preparation time is long and the workability is lowered. By contrast, the embodiment is enabled by the electronic cam to rapidly automatically cope with all bag lengths. Therefore, the cost can be remarkably reduced, and the productivity can be improved.

INDUSTRIAL APPLICABILITY

As described above, according to the invention, in a method of controlling an electronic cam type rotary cutter, a position loop is formed in a whole region on the basis of an electronic cam curve, an electronic cam curve of a cubic function is used as a position pattern for a noncutting zone, and an electronic cam curve of a quadratic function is used as a speed pattern, whereby a control is enabled with causing a same algorithm to automatically cope with long and short cutting operations and a change of a line speed. Therefore, the electronic cam control using an electronic cam curve in which the position pattern in a noncutting zone is a cubic function and the speed pattern is a quadratic function produces effects that a control due to the same algorithm can automatically cope with both long and short cut lengths or bag lengths and a change in conditions, that its traceability is largely enhanced, and that the control efficiency of the rotary cutter is improved.

In a method of controlling a rotary cutter, a position loop is formed in a whole region on the basis of an electronic cam curve, an electronic cam curve of a cubic function is used as a position pattern for a noncutting zone, and an electronic cam curve of a quadratic function is used as a speed pattern, whereby necessity of reduction of the line speed is eliminated even in a length range which is shorter than a range of a conventional art, and a cutting operation is enabled while maintaining the line speed to 100%. In a short cutting operation, the cutting is enabled without reducing the speed, thereby producing an effect that the productivity can be largely improved.

After driven by a servomotor, and performing a sealing work, a cutting work, or the like in synchronization with a workpiece such as a film or paper in a specific phase zone of one cycle of a rotary mechanism, a cubic function is used in a position command according to a continuous correlation control system including a prediction to a start of a work in a next cycle, and a quadratic function is used in a speed feedforward, whereby an optimum electronic cam curve is obtained while allowing a bag length or a cut length of the workpiece to automatically perform correspondence irrespective of a value of peripheral length/M. Therefore, after a sealing work, a cutting work, or another work is performed, position and speed patterns including a prediction to a sealing or cutting start position in a next cycle are uniquely obtained, and there is an effect that an optimum cam curve is automatically obtained while allowing a bag length or a cut length to automatically perform correspondence irrespective of the size relationship of peripheral length/M.

What is claimed is:

1. A method of controlling an electronic cam type rotary cutter or sealer driven by a servo motor, the method comprising:

preparing a correct position pattern for a whole region including cutting or sealing and non-cutting or non-sealing zones;

using an electronic cam curve of a cubic function as a position pattern for the non-cutting or nonsealing zone;

using an electronic cam curve of a quadratic function as a speed pattern;

forming a position loop in the whole region on the basis of the electronic cam curves, thereby performing a position control at every moment on the basis of said prepared correct position pattern, whereby a control is enabled causing a single algorithm to automatically cope with a long and short cutting or sealing operations and a change of a line speed.

2. A method of claim 1, wherein said electronic cam curve of said cubic function is used as a position command for said non-cutting zone with a resulting velocity in a quadratic function to decrease a root mean square of a torque of said servo motor.

3. A method of claim 1 or 2, wherein a speed pattern of a spiral blade due to a cam curve diagram is identical with the line speed in a cutting zone and, the speed pattern of a spiral blade due to a cam curve diagram is a quadratic curve which is raised in the short cutting operation, and a quadratic curve which is reduced in the long cutting operation, and a speed pattern of a straight blade is a pattern which is different from the spiral blade in that only the speed in the cutting zone is proportional to $1/\cos\theta$.

4. A method of claim 1 further comprising:

performing a sealing work or a cutting work, in synchronization with a workpiece in a specific phase zone of one cycle of said rotary cutter;

using said cubic function according to a continuous correlation control system including a prediction to a start of a work in a next cycle, and obtaining an optimum electronic cam curve while allowing a cut length of the workpiece to automatically perform correspondence irrespective of a value of peripheral length/M, M being the number of blades.

5. A method of producing an electronic cam curve according to claim 4, wherein a rotational speed $n_2$ and a rotational position $y_2$ of the cutting blade in the sealing zone or the cutting zone are $$n_2 = N_1$$

$$y_2 = (1/M - y_1)/(Tc - t_3) \times (t - Tc) + 1/M$$

where $N_1$ is the line speed at a start point $Y_1$ is a rotational position of a cutting start point, $t_3$ is a time of the cutting start point, and Tc is one cycle time, a curve equation of the non-cutting zone is a cubic function having four coefficients satisfying four boundary conditions of velocities $V_1$ and $V_2$ and positions $X_1$ and $X_2$ at times $T_1$ and $T_2$, a position x and a speed v which is obtained by differentiating the position x are indicated by $$x = At^3 + Bt^2 + Ct + D$$

$$v = 3At^2 + 2Bt + C$$

$(T_1, X_1)$ and $(T_2, X_2)$ are substituted into equation x, $(T_1, V_1)$ and $(T_2, V_2)$ are substituted into equation v, the equations are solved for A, B, C, and D, $T_1=0$, $T_2=t_3$, $X_1=0$, $X_2=Y_1$, $V_1=N_1/60$, and $V_2=N_1/60$ are substituted to obtain A, B, C, and D, and cam curve equations at a rotational speed=$n_1$ and a rotational position=$y_1$ in the non-cutting zone, and the rotational speed $n_2$ and the rotational position $y_2$ in the cutting zone are obtained as $$n_1 = 60\,(3At^2 + 2Bt + C)$$

$$n_2 = N_1$$

$$y_1 = At^3 + Bt^2 + Ct + D$$

$$y_2 = (1/M - Y_1)/(Tc - t_3) \times (t - Tc) + 1/M \qquad \text{(rev)}.$$

* * * * *